(12) United States Patent
Houston et al.

(10) Patent No.: US 8,384,316 B2
(45) Date of Patent: Feb. 26, 2013

(54) SYNCHRONIZED VIBRATION DEVICE FOR HAPTIC FEEDBACK

(75) Inventors: John Houston, New York, NY (US); Nathan Delson, San Diego, CA (US)

(73) Assignee: Coactive Drive Corporation, New York, NY (US)

( * ) Notice: Subject to any disclaimer, the term of this patent is extended or adjusted under 35 U.S.C. 154(b) by 0 days.

(21) Appl. No.: 13/030,663

(22) Filed: Feb. 18, 2011

(65) Prior Publication Data

US 2011/0248817 A1  Oct. 13, 2011

Related U.S. Application Data

(63) Continuation of application No. 11/476,436, filed on Jun. 27, 2006, now Pat. No. 7,919,945.

(60) Provisional application No. 60/694,468, filed on Jun. 27, 2005.

(51) Int. Cl.
*H02K 33/00* (2006.01)

(52) U.S. Cl. ........ 318/114; 318/128; 318/460; 340/429; 340/566

(58) Field of Classification Search ............ 318/34, 318/599, 677, 678, 680, 432, 114, 135, 700, 318/128, 460; 345/156; 340/429, 566, 683
See application file for complete search history.

(56) References Cited

U.S. PATENT DOCUMENTS

| | | | |
|---|---|---|---|
| 2,447,230 A | 8/1948 | Brown | |
| 4,098,133 A | 7/1978 | Frische et al. | |
| 4,710,656 A | 12/1987 | Studer | |
| 4,749,891 A | 6/1988 | Sheng | |
| 4,788,968 A | 12/1988 | Rudashevsky et al. | |
| 5,327,120 A | 7/1994 | McKee et al. | |
| 5,589,828 A | 12/1996 | Armstrong | |
| 5,643,087 A | 7/1997 | Marcus et al. | |
| 5,666,138 A | 9/1997 | Culver | |
| 5,780,948 A | 7/1998 | Lee et al. | |
| 5,857,986 A | 1/1999 | Moriyasu | |
| 5,923,317 A | 7/1999 | Sayler et al. | |
| 5,929,607 A * | 7/1999 | Rosenberg et al. ........... 320/166 |
| 6,002,184 A | 12/1999 | Delson et al. | |
| 6,009,986 A | 1/2000 | Bansemir et al. | |
| 6,023,116 A | 2/2000 | Kikuchi et al. | |
| 6,147,422 A | 11/2000 | Delson et al. | |

(Continued)

FOREIGN PATENT DOCUMENTS

| | | |
|---|---|---|
| EP | 1226852 A2 | 7/2002 |
| JP | 03-113337 A | 5/1991 |

(Continued)

OTHER PUBLICATIONS

Harmon, C. et al, "Multi-Axis Vibration Reduces Test Time", Evaluation Engineering, Jun. 2006, pp. 1-7.

(Continued)

*Primary Examiner* — Antony M Paul
(74) *Attorney, Agent, or Firm* — Lerner, David, Littenberg, Krumholz & Mentlik, LLP

(57) ABSTRACT

The present invention relates to synchronized vibration devices that can provide haptic feedback to a user. A wide variety of actuator types may be employed to provide synchronized vibration, including linear actuators, rotary actuators, rotating eccentric mass actuators, and rocking mass actuators. A controller may send signals to one or more driver circuits for directing operation of the actuators. The controller may provide direction and amplitude control, vibration control, and frequency control to direct the haptic experience. Parameters such as frequency, phase, amplitude, duration, and direction can be programmed or input as different patterns suitable for use in gaming, virtual reality and real-world situations.

39 Claims, 23 Drawing Sheets

U.S. PATENT DOCUMENTS

| | | |
|---|---|---|
| 6,275,213 B1 | 8/2001 | Tremblay et al. |
| 6,307,285 B1 * | 10/2001 | Delson et al. ............... 310/14 |
| 6,389,941 B1 | 5/2002 | Michler |
| 6,397,285 B1 | 5/2002 | Hashimoto et al. |
| 6,424,333 B1 | 7/2002 | Tremblay et al. |
| 6,618,646 B1 | 9/2003 | Dyer |
| 6,641,480 B2 | 11/2003 | Murzanski et al. |
| 6,679,776 B1 | 1/2004 | Nishiumi et al. |
| 6,693,622 B1 | 2/2004 | Shahoian et al. |
| 6,704,001 B1 | 3/2004 | Schena et al. |
| 6,742,960 B2 | 6/2004 | Corcoran et al. |
| 6,809,727 B2 | 10/2004 | Piot et al. |
| 6,824,468 B2 | 11/2004 | Murzanski et al. |
| 6,864,877 B2 * | 3/2005 | Braun et al. ............... 345/156 |
| 6,873,067 B2 | 3/2005 | Ichii et al. |
| 6,883,373 B2 | 4/2005 | Dyer |
| 6,982,696 B1 | 1/2006 | Shahoian |
| 6,992,462 B1 | 1/2006 | Hussaini et al. |
| 7,084,854 B1 | 8/2006 | Moore et al. |
| 7,091,948 B2 * | 8/2006 | Chang et al. ............... 345/156 |
| 7,182,691 B1 * | 2/2007 | Schena ............... 463/38 |
| 7,315,098 B2 | 1/2008 | Kunita et al. |
| 7,446,752 B2 | 11/2008 | Goldenberg et al. |
| 7,561,142 B2 | 7/2009 | Shahoian et al. |
| 2002/0024503 A1 | 2/2002 | Armstrong |
| 2002/0080112 A1 * | 6/2002 | Braun et al. ............... 345/156 |
| 2003/0038774 A1 | 2/2003 | Piot et al. |
| 2004/0108992 A1 | 6/2004 | Rosenberg |
| 2004/0164959 A1 | 8/2004 | Rosenberg et al. |
| 2004/0183782 A1 | 9/2004 | Shahoian et al. |
| 2004/0227727 A1 | 11/2004 | Schena et al. |
| 2004/0233161 A1 | 11/2004 | Shahoian et al. |
| 2004/0233167 A1 | 11/2004 | Braun et al. |
| 2005/0030284 A1 | 2/2005 | Braun et al. |
| 2005/0052415 A1 | 3/2005 | Braun et al. |
| 2005/0128186 A1 | 6/2005 | Shahoian et al. |
| 2005/0134561 A1 | 6/2005 | Tierling et al. |
| 2005/0134562 A1 | 6/2005 | Grant et al. |
| 2005/0195168 A1 | 9/2005 | Rosenberg et al. |
| 2005/0219206 A1 | 10/2005 | Schena et al. |
| 2005/0221894 A1 | 10/2005 | Lum et al. |
| 2005/0237314 A1 | 10/2005 | Ryynanen |
| 2007/0091063 A1 | 4/2007 | Nakamura et al. |

FOREIGN PATENT DOCUMENTS

| | | |
|---|---|---|
| JP | 2000-333464 A | 11/2000 |
| JP | 2001-212508 A | 8/2001 |
| JP | 2002-205008 A | 7/2002 |
| JP | 2003-199974 A | 7/2003 |
| JP | 2003-345233 A | 12/2003 |
| JP | 2004-174309 A | 6/2004 |
| KR | 10-2010-0029158 A | 3/2010 |
| KR | 10-2010-0125941 A | 12/2010 |
| WO | 9318475 A1 | 9/1993 |

OTHER PUBLICATIONS

"Essential Atlas of Physics and Chemistry" Barons, pp. 26-27.
Maor, E., "Trigonometric Delights", Princeton University Press, Princeton, NJ, 1998, pp. 145-149.
Wyle Laboratories, "Multi Axis-Dynamic Vibration System", 2006.
Freeman, M., "3-D Vibration Test System: Powerful, Unusual, International", Test Engineering & Management, Aug./Sep. 1992, pp. 10-12.
Jun. 27, 2006 U.S. Appl. No. 11/476,436, filed Jan. 1, 2000.
NanoMuscle Linear Actuator, http://3w.gfec.com.tw/english/service/content/elinear_actuator.htm, printed Jan. 2, 2006.
U.S. Appl. No. 11/325,036, filed Jan. 4, 2006.
Supplementary European Search Report, EP 06774221, dated Jun. 19, 2009.
Office Action from Japanese Application No. 2007-550426 dated Aug. 9, 2011.
Office Action from Japanese Application No. 2008-519530 dated Aug. 2, 2011.
European Search Report, EP 11174517, dated Nov. 28, 2011.
International Search and Written Opinion for Application No. PCT/US2012/029440 dated Oct. 24, 2012.

* cited by examiner

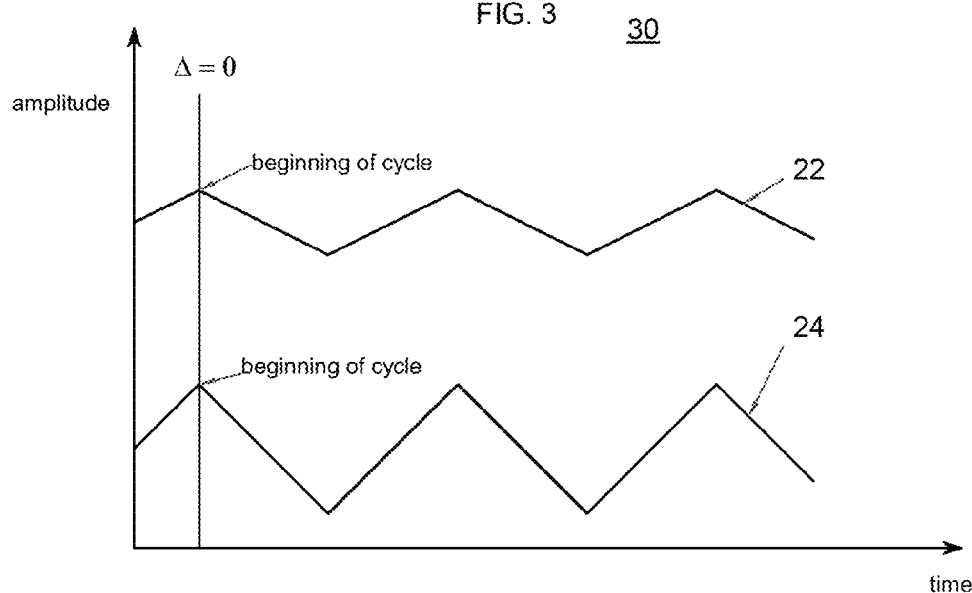
FIG. 3
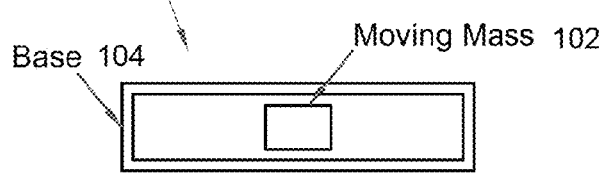
FIG. 4
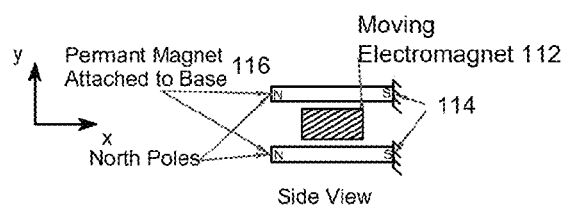
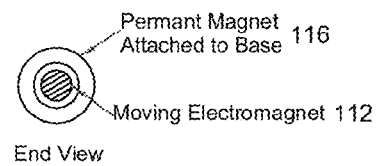
FIG. 5A    FIG. 5B

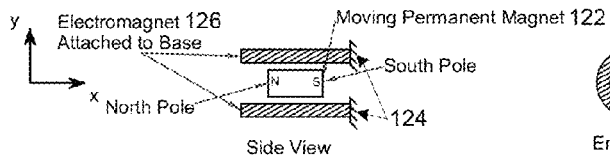
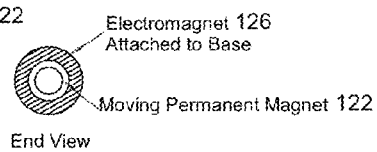
FIG. 6A    FIG. 6B
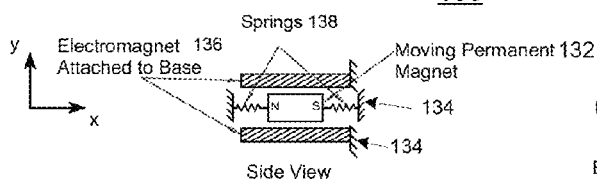
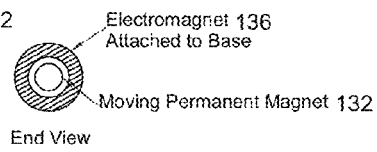
FIG. 7A    FIG. 7B
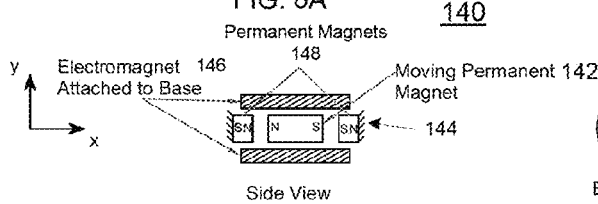
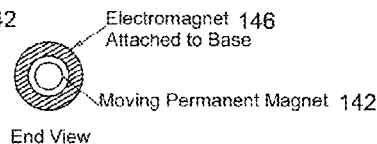
FIG. 8A    FIG. 8B
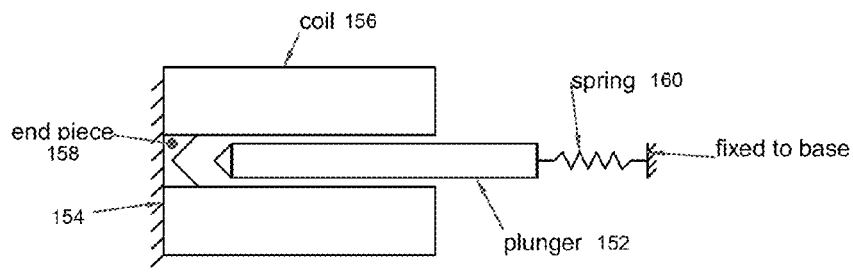
FIG. 9

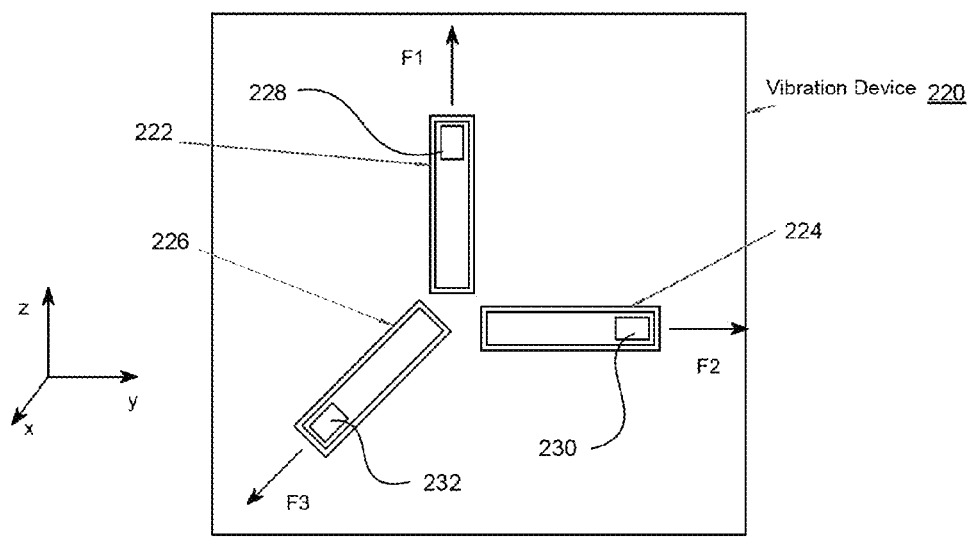
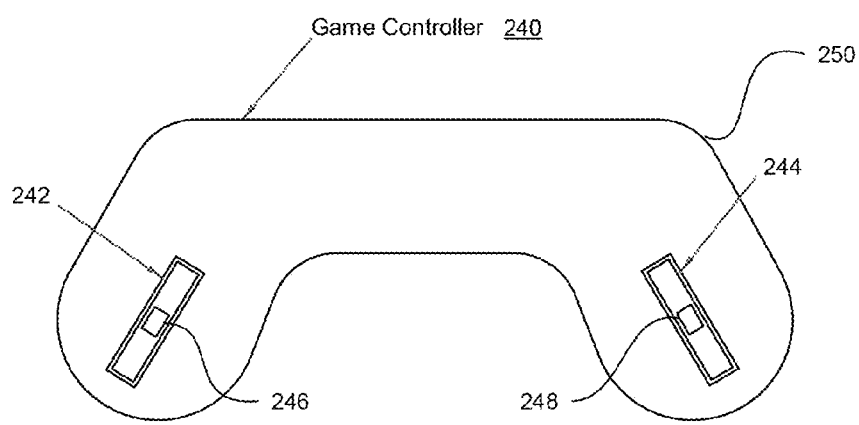

Vibration Device 260

Combined Force Vector
CFV

Pivoted Counterclockwise Position

Pivoted Clockwise Position

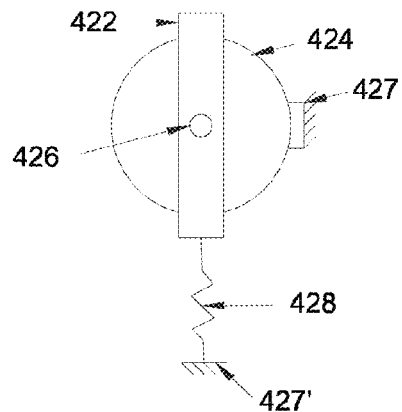
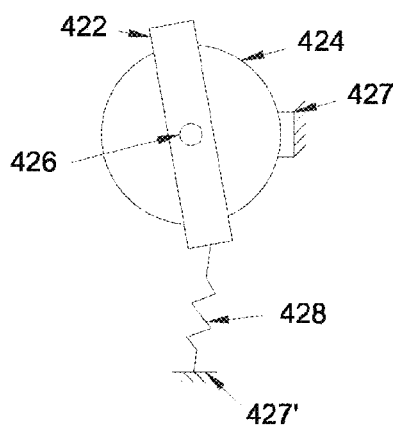
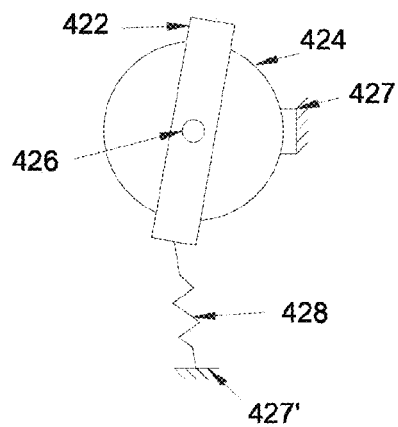

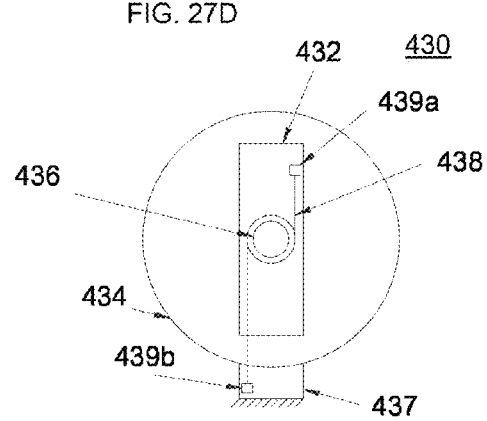
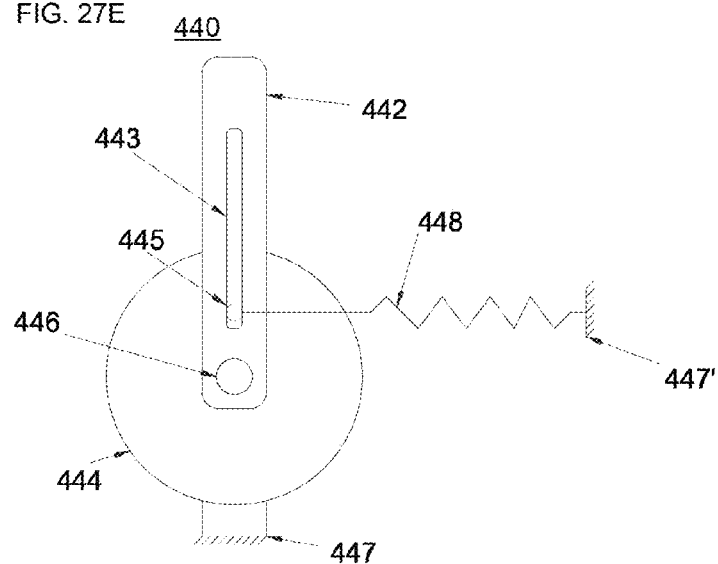
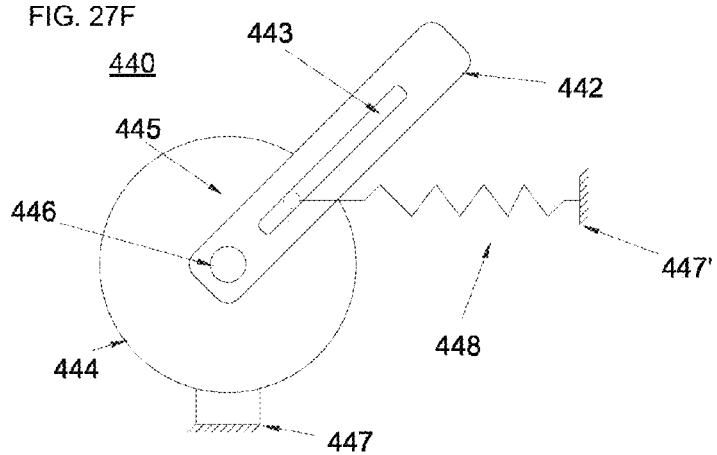

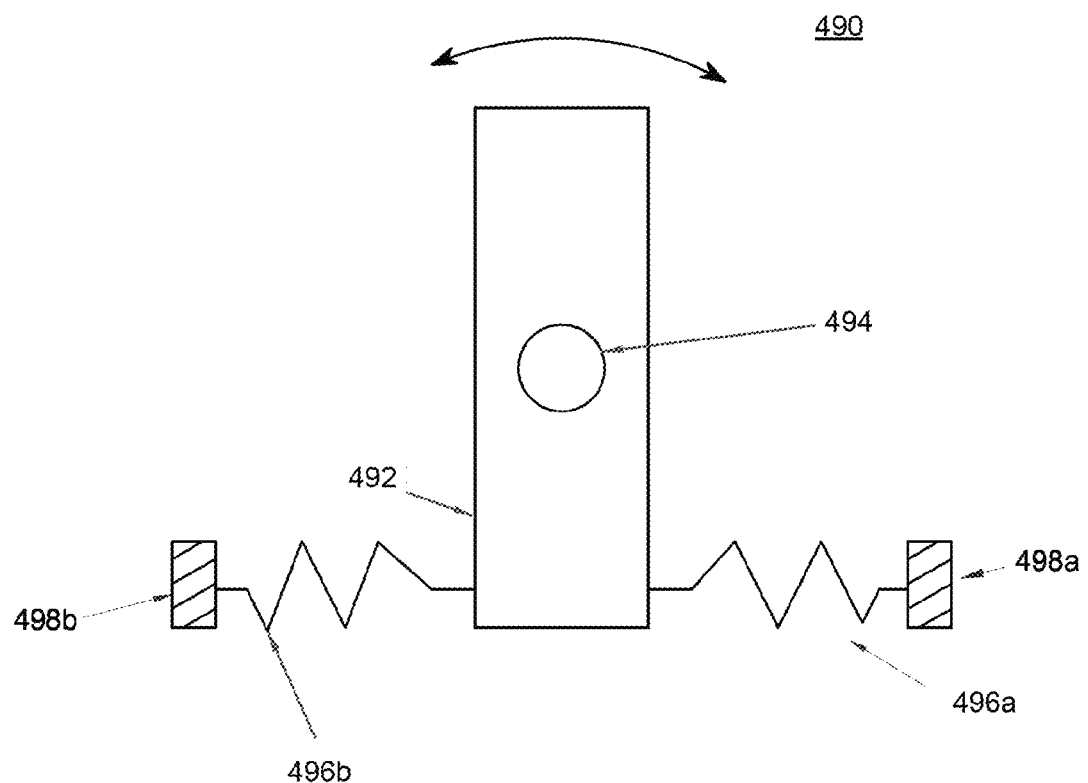

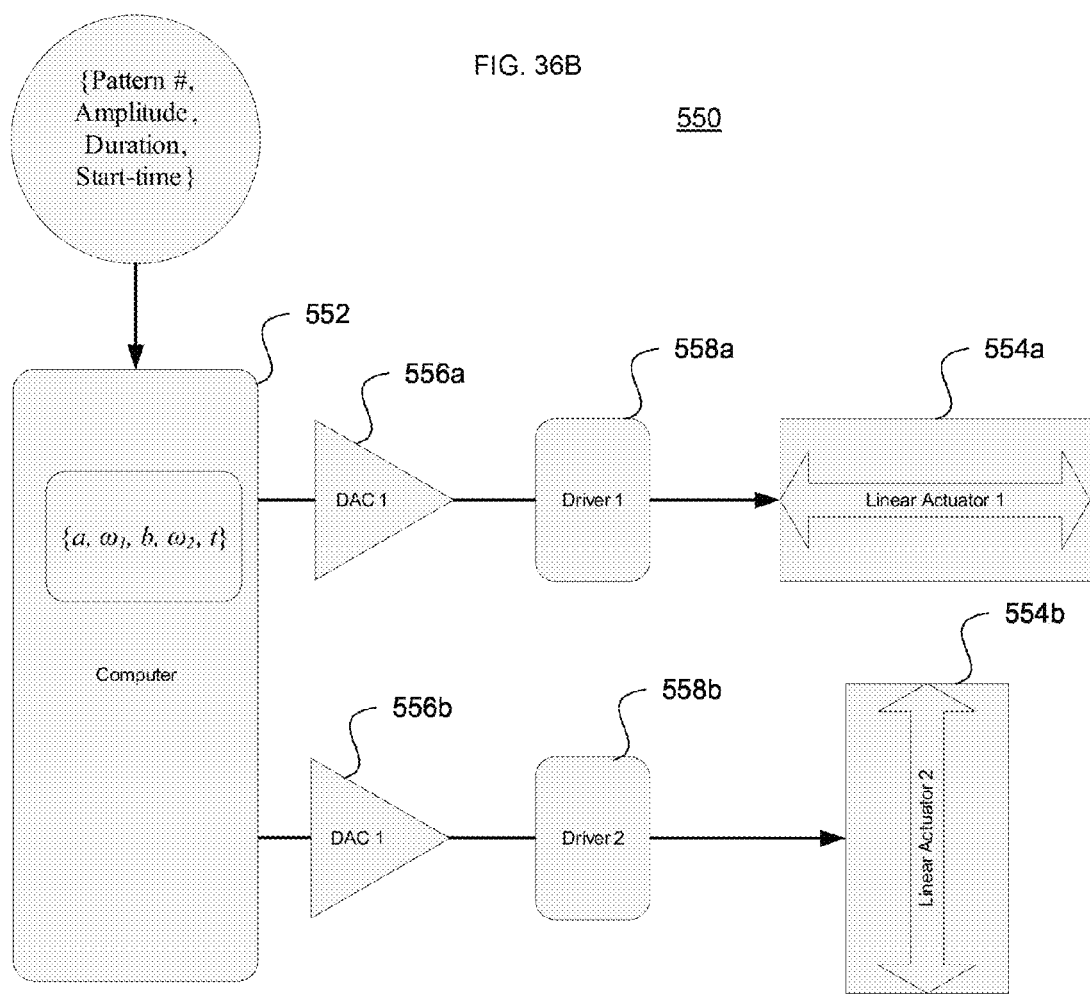

SYNCHRONIZED VIBRATION DEVICE FOR HAPTIC FEEDBACK

CROSS REFERENCE TO RELATED APPLICATIONS

This application is a continuation of U.S. application Ser. No. 11/476,436, filed Jun. 27, 2006 and entitled SYNCHRONIZED VIBRATION DEVICE FOR HAPTIC FEEDBACK, which claims the benefit of the filing date of U.S. Provisional Patent Application No. 60/694,468 filed Jun. 27, 2005 and entitled SYNCHRONIZED VIBRATION DEVICE FOR HAPTIC FEEDBACK, the entire disclosures of which are hereby expressly incorporated by reference herein.

BACKGROUND OF THE INVENTION

This invention is generally related to vibration devices. Applications include devices such as those that produce haptic sensations to enhance the realism of a video game, vibratory parts feeders, and vibration shakers.

Actuators that provide force feedback and haptic sensations are used for a wide range of applications including gaming devices, medical simulators, and flight simulators. Actuators in haptic devices create force sensations which are felt by the user.

One method for generating a haptic sensation is to use vibratory actuators such as those described in U.S. Pat. Nos. 6,275,213 and 6,424,333. Vibratory actuators provide a low cost method for generating force sensations, and multiple vibratory actuators can used to generate a range of sensations. In many existing devices vibrations are generated through rotary motors with an eccentric mass.

A limitation of eccentric mass rotary vibrators is that under continuous vibration the force of vibration is coupled to the magnitude of vibration, and thus it is not possible to modify the magnitude of vibration for a given vibration frequency. Another limitation of existing vibration devices is that the direction of vibration force is set by the orientation of the vibration actuators, and cannot be modified during operation.

In existing devices there is minimal or no directional information is provided to the user, and the force sensations are limited to the frequency of vibration of the actuators. In existing vibration devices with multiple vibration actuators, there is typically no synchronization of the vibration waveforms of the various actuators, and the phase difference between the different vibrations is not explicitly specified or controlled. This lack of synchronization limits the types of force effects that existing vibration devices can generate.

One application of vibration devices is in haptic input devices such as game controllers. Haptic devices use force to convey information to the user. In computer games and other applications it is desirable to convey a wide range of information to the user through force including frequency, magnitude, and direction of force. Since existing vibration devices do not convey all such information, there is a need to provide increased range of force sensations using vibratory actuators.

Existing tactile vibration devices often use small motors. These motors exert a low magnitude of force, and often require a number of vibration cycles before they build up sufficient force magnitude to be felt. Thus, many existing vibration devices provide tactile sensations that can only be felt at high frequency vibrations, where vibration energy can be built up over time. However, it may be desirable to also generate low frequency sensations to correspond to events that occur at a lower frequency than the vibration frequency. Thus there is a need to generate low frequency force sensations will small actuators.

SUMMARY OF THE INVENTION

The present invention provides a wide variety of vibration devices, haptic interfaces, game controllers and vibratory control systems.

One example of a vibration device of the present invention comprises of a plurality of vibration actuators that are synchronously vibrated. The actuators may be linear motion vibration actuators. In one alternative, the linear motion vibration actuators each include a moving magnet and a stationary electromagnetic coil. In another alternative, the linear motion vibration actuators each include a moving ferromagnetic plunger and a stationary electromagnetic coil. In a further alternative, the linear motion vibration actuators each include a moving electromagnet and a stationary permanent magnet.

In another example, a vibration device comprising a plurality of linear motion vibration actuators is operated by vibrating the actuators with similar frequency and phase. The amplitude of vibration of the actuators is controlled to achieve a desired direction of overall vibration force. For instance, the actuators may be vibrated with similar frequency and phase such that the maximum amplitude of vibration force occurs simultaneously in the linear motion vibration actuators.

In a further example, the vibration device comprises two linear motion vibration actuators such that the unit vectors are aligned with the direction of force created by the actuators to span a two dimensional space. Alternatively, the unit vectors need not be aligned with the direction of force created by the actuators and need not be parallel to each other.

In another example, a vibration device is comprised of three linear motion vibration actuators in which the unit vectors are aligned with the direction of force created by the actuators span a three dimensional space. A controller may be provided to synchronously vibrate these actuators.

A vibration device of another example comprises at least two linear motion vibration actuators where the unit vectors aligned with the direction of force created by the actuators span a two dimensional space. Alternatively, the unit vectors aligned with the direction of force created by the actuators may span a three dimensional space.

A vibration device comprising a plurality of vibration actuators may be configured so that the actuators are vibrated with similar frequency and phase such that the maximum amplitude of vibration force occurs simultaneously in the vibration actuators.

In another example, a vibration device comprises a plurality of vibration actuators attached to an enclosure of the vibration device and are synchronously vibrated. The actuators may be attached to a rigid component, a relatively rigid component, or a semi-rigid component of the vibration device.

A haptic interface of another example comprises a plurality of linear motion vibration actuators that are vibrated with similar frequency and phase. The amplitude of vibration of the actuators is preferably controlled to achieve a desired direction of overall vibration force. In one instance, the actuators each comprise of a moving magnet and a stationary electromagnet which applies forces onto the moving magnet.

A computer system may be provided according to the present invention which includes a graphical display and a haptic interface. The haptic interface may comprise a plurality of linear motion vibration actuators which are vibrated with similar frequency and phase. The amplitude of vibration of these actuators is controlled to achieve a direction of overall vibration force which corresponds to the direction of an event which is displayed on the computer system's graphical display. The haptic interface may comprise a pair of linear motion vibration actuators that are located in the handles of a hand held controller. The actuators can be vibrated with similar frequency and phase. The amplitude of vibration of these actuators is controlled to achieve a direction of overall vibration force which corresponds to the direction of an event which is displayed on the computer system's graphical display.

In another example, a vibration device comprises a plurality of rotary vibration actuators that are synchronously vibrated. A pair of rotary vibration actuators with eccentric weights may be employed. Here, one of the pair of actuators can be rotated clockwise and the other can be rotated counterclockwise in the same plane. The shaft angles at which the centrifugal force generated by the eccentric weights is preferably aligned for both actuators, and is desirably repeated for multiple revolutions. One or both of the actuators may be stepper motors. In one case, the centrifugal force generated by the eccentric weights is aligned to corresponds to a direction of an event within a computer simulation.

In accordance with an embodiment of the present invention, a vibration device is provided, which comprises a base member and a plurality of actuators coupled to the base member. The plurality of actuators includes a first actuator and a second actuator. The first actuator has a first member and a second member. The first member is operatively coupled to a first portion of the base member. The second member is moveable relative to the first member of the first actuator. The second actuator also has a first member and a second member. The first member is operatively coupled to a second portion of the base member. The second member is moveable relative to the first member of the second actuator. The vibration device also comprises means for synchronously vibrating at least the first and second ones of the plurality of actuators.

In one alternative, at least one of the first and second actuators preferably comprises a linear motion vibration actuator. In an example, the first member of the linear motion vibration actuator desirably includes a permanent magnet, the second member of the linear motion vibration actuator desirably includes an electromagnet, and the synchronously vibrating means is operable to modulate a magnetic force between the electromagnet and the permanent magnet. In another alternative, the first member of the linear motion vibration actuator desirably includes an electromagnet, the second member of the linear motion vibration actuator desirably includes a permanent magnet, and the synchronously vibrating means is operable to modulate a magnetic force between the electromagnet and the permanent magnet.

In another alternative, the vibration device further comprises a spring device coupled to the second member of the linear motion vibration actuator for providing a restoring force thereto. In a further alternative, the synchronously vibrating means operates the first and second actuators at a substantially identical phase and a substantially identical frequency. In yet another alternative, the synchronously vibrating means controls operation of the first and second actuators to vary at least one of an amplitude of a combined vibration force of the first and second actuators and a direction of the combined vibration force. In a further alternative, the second actuator may be oriented non-orthogonally relative to the first actuator.

In another alternative, the plurality of actuators further includes a third actuator having a first member and a second member. Here, the first member of the third actuator is coupled to a third portion of the base member, and the second member thereof is moveable relative to the first member of the third actuator. The first, second and third actuators are oriented such that the vibration device is operable to generate a three dimensional combined vibration force.

In a further alternative, at least one of the first and second actuators comprises a rotary actuator. In one example, the rotary actuator includes a pivoting mass. In this case the vibration device preferably further comprising a spring device coupled to the pivoting mass and to the base member. Here, the synchronously vibrating means is operable to control the vibration device at a resonant frequency of the pivoting mass and the spring device. The spring device may be coupled to the pivoting mass such that a nonlinear spring force is generated.

In another alternative, the vibration device further comprises a pair of spring devices. Here, at least one of the first and second actuators comprises a rocking actuator having a rocking mass pivotally coupled at one end thereof to the base member by the pair of spring devices.

In a further alternative, at least the first and second actuators of the plurality of actuators are synchronously vibrated for a first duration of time and are vibrated asynchronously for a second duration of time.

In accordance with another embodiment of the present invention, a vibratory control system is provided. The vibratory control system comprises a plurality of actuators coupled to a base, a plurality of drivers and a controller. The plurality of actuators includes first and second actuators. The first actuator has a first member and a second member moveable relative to the first member thereof. The first member of the first actuator is operatively coupled to a first portion of the base. The second actuator has a first member and a second member moveable relative to the first member thereof. The first member of the second actuator is operatively coupled to a second portion of the base. Each of the plurality of drivers is operatively coupled to one of the plurality of actuators. The controller is coupled to the plurality of drivers and operable to provide amplitude, phase and frequency information to the plurality of drivers to synchronously vibrate at least the first and second ones of the plurality of actuators.

In one alternative, at least one of the frequency and phase information provided to the first actuator is substantially identical to the frequency and phase information provided to the second actuator. In another alternative, the controller includes a direction and amplitude controller operable to specify a combined vibration amplitude and a direction of vibration, a frequency controller operable to specify a vibration frequency, and a vibration controller operable to control the combined vibration amplitude, the direction of vibration and the vibration frequency to synchronously vibrate at least the first and second ones of the plurality of actuators.

In a further alternative, the system further comprises a haptic interface operable to provide a force sensation to the user. In this case, the haptic interface desirably includes the plurality of actuators and the plurality of drivers, and further includes an input device for receiving the input from the user. Optionally, the system further includes a display device operatively connected to the controller for providing a visual display to the user.

In accordance with other aspects of the present invention a game controller is provided, which comprises a housing, at least one input device disposed in the housing for receiving input from a user, and first and second actuators. The first actuator is disposed in the housing and has a fixed member coupled to the housing and a moveable member operatively engaged with the fixed member and moveable relative thereto. The second actuator is disposed in the housing and has a fixed member coupled to the housing and a moveable member operatively engaged with the fixed member and moveable relative thereto. The first and second actuators are operable to synchronously vibrate such that a haptic sensation is provided to the user.

In one example, the second actuator is oriented such that a vibration force of the second actuator is not parallel to a vibration force of the first actuator. In another example, the second actuator is positioned over the first actuator to minimize torque during synchronized vibration. In a further example, the first and second actuators generate a torque during synchronized vibration.

In one alternative, at least one of the first and second actuators is preferably a pivoting actuator or a linear actuator operable to generate frequencies below 50 Hertz. In another alternative, the first and second actuators preferably each comprise a rotary actuator, and an axis of a rotating shaft of the first actuator is aligned with an axis of a rotating shaft of the second actuator.

In accordance with further aspects of the present invention, a vibration device comprises a base member and first and second actuators. The first actuator is operatively attached to the base member. The first actuator is operable to generate a first vibration force having a first frequency of vibration and a first magnitude of vibration associated therewith. The first actuator is further operable to impart the first vibration force to the base member. The second actuator is operatively attached to the base member. The second actuator is operable to generate a second vibration force having a second frequency of vibration and a second magnitude of vibration associated therewith. The second actuator is further operable to impart the second vibration force to the base member. The vibration device also comprises a means for controlling the first and second actuators so that the first frequency of vibration is substantially identical to the second frequency of vibration, and a means for independently modulating the magnitudes of the first and second vibration forces to control a direction of a combined vibration force applied onto the base member. The combined vibration force is a vector sum of the first and second vibration forces. The vibration device further comprises means for controlling timing of vibrations of the first and second actuators so that peaks of the magnitudes of the first and second vibration forces occur substantially concurrently.

In one alternative, each of the actuators comprises a first member operatively coupled to the base member and a second member movable relative to the corresponding first member. In another alternative, the first and second actuators are controlled to vibrate in-phase. In a further alternative, the first frequency of vibration is a primary frequency of the first actuator and the second frequency of vibration is a primary frequency of the second actuator.

In another alternative, an electromagnetic force is generated between the first and second members in both of the first and second actuators. In this case, the first member of each actuator desirably includes a permanent magnet and the second member of each actuator desirably includes an electromagnet.

In a further alternative, the first and second actuators each further comprise a spring device that generates force between the first and second members of the respective actuator. In one example, both the first actuator and the second actuator are preferably operated at substantially a natural frequency of the respective actuator. In another example, both of the actuators are operated over a range of frequencies of the respective actuator. In this case, the range of frequencies includes a natural frequency of the respective actuator.

In another alternative, the direction of the combined vibration force corresponds to a direction of an event in a computer simulation. In this case, a change in the direction of the combined vibration force may correspond to a change in the direction of a simulated motion in the computer simulation.

In a further alternative, the direction of the combined vibration force applied onto the base member is controlled to vary over time.

In accordance with another embodiment of the present invention, a vibration device is provided. The vibration device comprises a base member, a first actuator operatively attached to the base member and having a member moveable relative to the base, and a second actuator operatively attached to the base member and having a member moveable relative to the base. The first actuator is operable to apply a first force onto the base member and the second actuator is operable to apply a second force onto the base member. The vibration device further comprises means for controlling timing of the first and second actuators such that the moveable member of each of the first and second actuators repeatedly reverses direction of motion relative to the base member at substantially the same time.

In one alternative, the vibration device further comprises means for independently modulating magnitudes of the first and second forces to control a direction of a combined force applied onto the base member. The combined force is a vector sum of the first and second forces.

In another alternative, the vibration device further comprises means for independently modulating the magnitudes of the first and second forces to control a magnitude of a combined force applied onto the base member. The combined force is a vector sum of the first and second forces. Here, the means for independently modulating is preferably further operable to control a direction of the combined force applied onto the base member.

In another alternative, the means for controlling the timing of the first and second actuators is further operable to repeatedly reverse a direction of translation of the movable member of each actuator relative to the base member at substantially the same time.

In another alternative, the means for controlling the timing of the first and second actuators is further operable to repeatedly reverse a direction of rotation of the movable member of each actuator relative to the base member at substantially the same time.

In yet another alternative, the means for controlling adjusts the timing of the first and second actuators such that the movable member of the first actuator reverses direction of motion relative to the base member at every occurrence that the movable member of the second actuator reverses direction of motion relative to the base member. The reversals of the direction of motion corresponding to the first and second actuators occur at substantially the same time.

In a further alternative, for a first duration of vibration the means for controlling the timing of the first and second actuators is operable to cause the movable member of the first actuator to reverse direction of motion relative to the base member for every occurrence that the movable member of the second actuator reverses direction of motion relative to the base member. Here, the reversals of motion occur at substantially the same time. For a second duration of vibration the means for controlling the timing of the first and second actuators is operable to cause the movable member of the first actuator to not reverse direction of motion relative to the base member for every occurrence that the movable member of the second actuator reverses direction of motion relative to the base member. Here, the reversals of motion do not occur at substantially the same time.

In accordance with yet another embodiment of the present invention, a method of controlling a vibratory device is provided. The method comprises imparting a first vibration force to a base with a first actuator, imparting a second vibration force to the base with a second actuator, and synchronously vibrating the first and second actuators to impart a combined vibration force to the base by applying amplitude information, phase information and frequency information to the first and second actuators.

In one alternative, the frequency information applied to the second actuator is substantially identical to the frequency information applied to the first actuator, and the phase information applied to the second actuator is substantially identical to the phase information applied to the first actuator.

In another alternative, the method further comprises specifying a combined vibration amplitude and a direction of vibration, specifying a frequency of vibration, and controlling the combined vibration amplitude, the direction of vibration and the frequency of vibration to synchronously vibrate the first and second actuators.

In accordance with a further embodiment of the present invention, a method for operating a vibration device comprises (a) providing a first actuator operable to generate a first vibration force having a first frequency of vibration and a first magnitude of vibration associated therewith, the first actuator being further operable to impart the first vibration force to a base member; (b) providing a second actuator operable to generate a second vibration force having a second frequency of vibration and a second magnitude of vibration associated therewith, the second actuator being further operable to impart the second vibration force to the base member; (c) controlling the first and second actuators so that the first frequency of vibration is substantially identical to the second frequency of vibration; (d) independently modulating the magnitudes of the first and second vibration forces to control a direction of a combined vibration force applied onto the base member, wherein the combined vibration force is a vector sum of the first and second vibration forces; and (e) controlling timing of vibrations of the first and second actuators so that peaks of the magnitudes of the first and second vibration forces occur substantially concurrently.

In accordance with another embodiment of the present invention, a method of controlling a vibration device comprises: (a) providing a first actuator having a member moveable relative to a base, the first actuator being operable to apply a first force onto the base member; (b) providing a second actuator having a member moveable relative to the base, the second actuator being operable to apply a second force onto the base member; and (c) controlling timing of the first and second actuators such that the moveable member of each of the first and second actuators repeatedly reverses direction of motion relative to the base member at substantially the same time.

In one alternative, the method further comprises independently modulating magnitudes of the first and second forces to control a direction of a combined force applied onto the base member. The combined force is a vector sum of the first and second forces.

In another embodiment, a vibration device is adapted to produce haptic sensations. The vibration device comprises a base member and a plurality of actuators being coupled to the base member. The plurality of actuators includes first and second actuators. The first actuator has a first member and a second member. The first member is operatively coupled to the base member, and the second member is moveable relative to the first member of the first actuator. The second actuator has a first member and a second member. The first member thereof is operatively coupled to the base member, and the second member thereof is moveable relative to the first member of the second actuator. The vibration device further includes means for modified synchronization of vibration of at least the first and second actuators. The second actuator vibrates at a frequency that is an integer multiple of the vibration frequency of the first actuator, where the value of the integer being greater than one.

In a further embodiment, a vibration device comprises a base member and a plurality of actuators coupled to the base member. The plurality of actuators includes a first actuator having a first member and a second member. The first member is operatively coupled to the base member, and the second member is moveable relative to the first member of the first actuator. The plurality of actuators also includes a second actuator having a first member and a second member. The first member of the second actuator is operatively coupled to the base member, and the second member thereof is moveable relative to the first member of the second actuator. The vibration device further includes means for synchronously vibrating the first and second actuators, and means for exciting the first and second actuators at a resonant frequency.

In yet another embodiment, a vibratory control system comprises a plurality of actuators coupled to a base, including at least first and second actuators. The system also includes first and second drivers. The first driver is operatively coupled to the first actuator, and is configured to provide a signal waveform to the first actuator. The second driver is operatively coupled to the second actuator, and is configured to provide a signal waveform to the second actuator. A controller is coupled to the plurality of drivers. The controller is configured to generate the signal waveforms for the first and second drivers and is operable to synchronously vibrate the first and second actuators to produce a pattern using the signal waveforms.

And in a further embodiment, a vibratory control system comprises a plurality of actuators coupled to a base. The plurality of actuators including at least first and second actuators. A first driver is operatively coupled to the first actuator, and is configured to provide a signal waveform to the first actuator. A second driver is operatively coupled to the second actuator, and is configured to provide a signal waveform to the second actuator. A controller is coupled to the plurality of drivers. The controller is configured to generate the signal waveforms for the first and second actuators and is operable to synchronously vibrate the first and second actuators via the first and second drivers to generate a combined torque vibration on the base.

BRIEF DESCRIPTION OF THE DRAWINGS

FIG. 3 illustrates a pair of in-phase vibration profiles.

FIG. 4 illustrates a linear motion vibration actuator for use with the present invention.

FIGS. 5A-B illustrate an example of a linear motion vibration actuator in accordance with the present invention.

FIGS. 6A-B illustrate another example of a linear motion vibration actuator in accordance with the present invention.

FIGS. 7A-B illustrate a further example of a linear motion vibration actuator in accordance with the present invention.

FIGS. 8A-B illustrate yet another example of a linear motion vibration actuator in accordance with the present invention.

FIG. 9 illustrates a further example of a linear motion vibration actuator in accordance with the present invention.

FIG. 15 illustrates a vibration device employing a set of linear actuators for generation of a three dimensional force vector in accordance with aspects of the present invention.

FIG. 16 illustrates a game controller in accordance with aspects of the present invention.

FIGS. 27A-F illustrate a further pivoting actuator in accordance with aspects of the present invention.

FIG. 30 illustrates a rocking actuator in accordance with aspects of the present invention.

FIGS. 36A-B illustrate equation parameter and pattern selection processing in accordance with aspects of the present invention.

DETAILED DESCRIPTION

Figure 1:
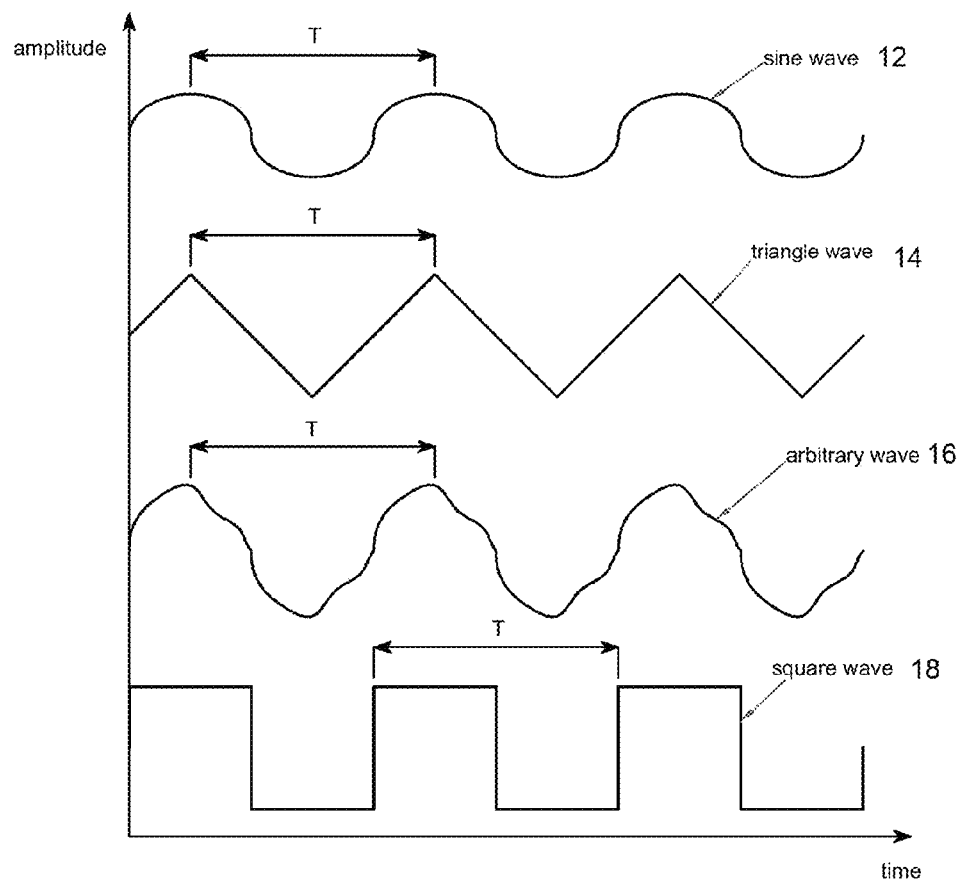
FIG. 1 is a chart illustrating a number of different waveform types suitable for use with the present invention.

The foregoing aspects, features and advantages of the present invention will be further appreciated when considered with reference to the following description of preferred embodiments and accompanying drawings, wherein like reference numerals represent like elements.

As used herein, an actuator is a device that can generate mechanical motion and force. Actuators can convert a source of energy into mechanical motion or force. The source of energy can be electrical, pneumatic, hydraulic, or another source. Examples of actuators include rotary and linear motors. Examples of electric actuators include DC, AC, and stepper motors.

A vibration (or vibratory) actuator can impart repeated forces onto an object. These repeated forces can repeat a similar force profile over time during each repetition. Examples include rotary motors with eccentric masses, and linear actuators which move masses back and forth. These actuators can be DC, AC, stepper, or other types of actuators. A vibration actuator can repeat a similar force profile (waveform) in each cycle, or there can be variations in force profiles between cycles. Variations between cycles can be in amplitude, frequency, phase, and profile shape.

When a force is generated in a repeated cycle it can generate a vibratory force. The profile (also referred to as a waveform) of a repeated force cycle can be in a sinusoidal shape, triangular wave, a square wave, or other repeated profile as shown in FIG. 1. The frequency of vibration describes how frequently a vibration cycle is repeated. A frequency of vibration, f, is defined as the number of vibrations per unit time, and often is given in Hertz whose units are cycles per second. The period of vibration, T, is the duration of each cycle in units of time. The mathematical relationship between frequency and period of vibration is given by the following equation:

$$f = 1/T \tag{1}$$

A vibration force, F, is in a repeated cycle when $$F(t+T) = F(t) \tag{2}$$

where T is the period of vibration and t is time.

For purposes of vibration devices it is sufficient for the period of vibration to be approximate, and therefore a vibration is considered to be in a repeated cycle when:

$$F(t+T) \approx F(t) \tag{3}$$

One vibration waveform is a sinusoidal waveform, where the vibration force can be given by:

$$F(t) = A \sin(\omega t + \phi) \tag{4}$$

Here, F(t) is force as a function of time. A is the maximum amplitude of force. $\omega$ is the frequency of vibration in radians per second (the frequency in Hertz is $f=\omega/(2\pi)$). And $\phi$ is the phase of vibration in radians. When $\omega t=2\pi$ the force profile repeats itself.

A vibration actuator may impart repeated forces onto an object. Due to the dynamics of an actuator, a single actuator can impart forces at multiple frequencies at the same time. However, for the purposes of analyzing vibrations and describing vibration devices herein, the primary frequency of an actuator's motion means the frequency having the largest component of kinetic energy in it.

The period of vibration can be defined by the time elapsed between the beginning of one vibration cycle and beginning of the next cycle. Thus to identify the period of vibration it is useful to identify the beginning of a cycle. One method for defining the beginning of cycle is to define the beginning of the cycle as the point with maximum amplitude in the profile. FIG. 1 is an amplitude versus time chart 10 showing the vibration profiles of a sine wave 12, a triangle wave 14, an arbitrarily shaped profile 16, and a square wave 18. The period for each of these profiles is designated by T.

The sine wave 12, triangle wave 14, and arbitrary profile wave 16 all have a unique point of maximum amplitude during each repeated cycle, and this point of maximum amplitude is used to define the beginning of the cycle. The square wave 18 does not have a unique point of maximum amplitude within a cycle; in such cases a repeated point on the profile can be selected to designate the beginning of the cycle. In FIG. 1, the point at which the square wave 18 transitions from a low value to a high value is designated at the beginning point of the cycle, and used use to define the period of the repeated profile. Thus, any profile that can be represented as repeated cycles can represent a vibration.

A frequency of vibration can also be identified when the shape of signal does not consist of exactly repeated profiles. Variations in amplitude of the cycle and small changes in the shape of a cycles profile still allow one to identify a unique point that designates the beginning of the cycle. As long as a repeated point in the profile can be identified, then the beginning of each cycle, a vibration period, and vibration frequency can be determined.

Figure 2:
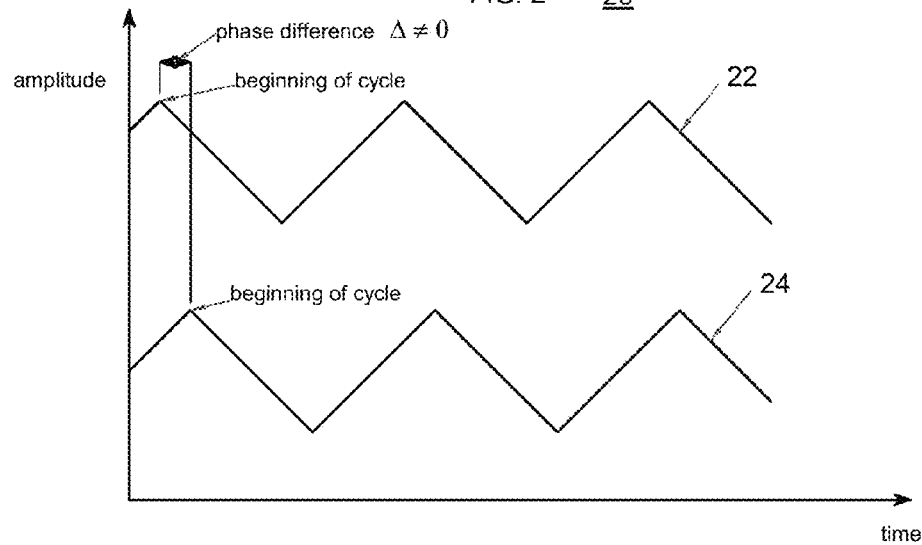
FIG. 2 illustrates a pair of vibration profiles having a phase difference.

The phase of vibration defines the timing of the beginning of a cycle of vibration. A phase difference between two vibration waveforms is defined as the difference between the beginning of a vibration cycle in one waveform and the beginning of a vibration cycle in the other waveform. If there is a nonzero difference in the phase of vibration between two profiles, then the beginning of the cycles do not coincide in time. FIG. 2 is an amplitude versus time chart 20 showing two vibration profiles, 22 and 24, with a phase difference $\Delta$ between them. The phase difference $\Delta$ can be given in units of time, such as shown in FIG. 2. Alternatively, the phase of vibration can also be given in radians for sinusoidal vibrations. When the phase difference $\Delta$ between two waveforms is zero, then the two waveforms are considered to be in-phase, as shown in the amplitude versus time chart 30 of FIG. 3.

As long as it is possible to identify the beginning of a cycle it is possible to identify a phase of vibration, even when the amplitude and frequency of vibration change between cycles of vibration.

Synchronized vibration is defined as a vibration force formed by the superposition of two or more vibration waveforms where each of the waveforms include peaks that coincide in time with the peaks of the other waveforms on a regularly repeating basis. In a preferred embodiment, each of the waveforms would have the same frequency and a specified phase difference between them. Superposition can preferably be the vector sum of forces, torque, or forces and torque. Typically, the sources of these vibration waveforms are different vibration actuators. Often in synchronous vibration the waveforms have a zero phase difference between them, and thus the vibration waveforms are in-phase and in synchronous vibration. As used herein, specified phase difference may range between and including 0° and 360°. In preferred embodiments, the specified phase difference is 0° or 180°. In synchronized vibration, the various vibration waveforms can have different amplitudes. FIG. 3 illustrates two vibration waveforms of triangular profile that are synchronized. Both of these waveforms have the same frequency, they have different amplitudes, and the waveforms are in-phase. The maximum amplitude of both waveforms in FIG. 3 occurs at the same time.

Typically, synchronized vibration profiles will have similar shaped profiles. However, vibration actuators with different shaped vibration profiles can also be vibrated synchronously by matching frequency of vibration and specifying the phase difference between the waveforms. The matching of phase and frequency of vibration can be done approximately and still result in synchronized vibration.

Synchronized vibration can be generated by adding two vibration profiles together, where the amplitude of the second vibration profile is a multiple of the amplitude of the first vibration profile. This multiplying factor can be either positive or negative.

If there are two or more vibrating actuators where the peak amplitude of force of each vibrating actuator occurs repeatedly at approximately the same time, then these actuators are in-phase and in synchronous vibration. The peak amplitude of force can be either in the positive or negative direction of the vibration actuators' or vibration device's coordinate system. Thus if a positive peak amplitude from one actuator occurs at approximately the same time as the negative peak amplitude of another actuator, then these actuators are in-phase and are in synchronous vibration.

An exemplary linear motion vibration actuator 100 is shown in FIG. 4. As shown, the linear motion vibration actuator 100 contains a moving mass 102 and a base 104. The moving mass 102 moves relative to the base 104 in a back and forth linear motion. Force can be applied from the base 104 to the moving mass 102 and in a similar fashion from the moving mass 102 onto the base 104. The force transfer can occur, for instance, via magnetic forces, spring forces, and/or lead screw forces. Examples of linear actuators suitable for use in accordance with the present invention are described in U.S. Pat. Nos. 5,136,194 and 6,236,125, and in U.S. patent application Ser. No. 11/325,036, entitled "Vibration Device," the entire disclosures of which are hereby incorporated by reference herein.

As the moving mass 102 in the linear motion vibration actuator 100 moves back and forth, forces are generated between the moving mass 102 and the base 104. These forces can be transmitted through the base 104 of the actuator 100 to an object that the actuator is mounted to (not shown). The moving mass 102 may also be attached to an object, such as a handle (not shown), that is external to the actuator 100, and may transmit forces directly to an object external to the actuator 100.

The forces in the linear motion vibration actuator 100 may be magnetic forces, such as with a voice coil. The moving mass 102 may contain, for instance, a permanent magnet, electromagnet, ferromagnetic material, or any combination of these. The base 104 may contain, for instance, a permanent magnet, an electromagnet, ferromagnetic material, or any combination of these. Magnetic forces may be generated between base 104 and the moving magnet that generate acceleration and motion of the moving mass 104. A force in the linear motion vibration actuator 100 generated with an electromagnet can be modulated by controlling the current flowing through the electromagnet.

One embodiment of linear motion vibration actuator 100 in accordance with the present invention is shown in FIGS. 5A-B as linear motion vibration actuator 110. Actuator 110 preferably contains a moving mass 112 that comprises an electromagnet, as well as a permanent magnet 116 attached to the base 114. The motion of the moving mass 112 is along the x axis as shown in the side view in FIG. 5A. The magnetization polarity of the permanent magnet 116 is along the x axis as shown by the North and South poles on the permanent magnet 116. The electromagnet is preferably configured as a coil wound about the x axis. As shown in the end view of FIG. 5B, in the present embodiment the shape of the electromagnet is desirably cylindrical and the shape of the permanent magnet 116 is desirably tubular, although the electromagnet and the permanent magnet 116 may have any other configuration. In this embodiment both the electromagnet and the permanent magnet 116 may have ferromagnetic material placed adjacent to them to increase the force output of the actuator 110.

In this embodiment, the force in the actuator 110 can be modulated by controlling the current in the electromagnet. When the current in the electromagnet flows in one direction, then the magnetic force will push the moving mass 112 towards one side of the actuator. Conversely when the current in the electromagnet flows in the other direction, then the moving mass 112 will be pushed to the other side of the actuator 110. Increasing the amount of current in the electromagnet will increase the amount of force applied onto the moving mass 112.

Another embodiment of the linear motion vibration actuator 100 in accordance with the present invention is shown in FIGS. 6A-B. Here, linear motion vibration actuator 120 preferably contains a moving mass 122 that comprises a permanent magnet, as well as an electromagnet magnet 126 attached to base 124. The motion of the moving mass 122 is along the x axis as shown in the side view in FIG. 6A. The magnetization polarity of the permanent magnet is along the x axis as shown by the North and South poles on the permanent magnet. The electromagnet 126 is preferably a coil wound about the x axis. As shown in the end view of FIG. 6B, in this embodiment the shape of the electromagnet 124 is tubular and the shape of the permanent magnet is cylindrical.

In this embodiment both the electromagnet 124 and the permanent magnet of the moving mass 122 may have ferromagnetic material placed adjacent to them to increase the force output of the actuator 120. The force in the actuator 120 can be modulated by controlling the current in the electromagnet 124. When the current in the electromagnet 124 flows in one direction, then the magnetic force will push the moving mass 122 towards one side of the actuator 120. Conversely when the current in the electromagnet flows in the other direction, then the moving mass 122 will be pushed to the other side of the actuator 120. Increasing the amount of current in the electromagnet will increase the amount of force applied onto the moving mass 122.

Another embodiment of the linear motion vibration actuator 100 in accordance with aspects of the present invention is shown in FIGS. 7A-B, which is similar to the embodiment shown in FIGS. 6A-B. Here, actuator 130 includes a moving mass 132 and a base 134. The moving mass 132 preferably comprises a permanent magnet. An electromagnet 136 at least partly surrounds the moving mass 132. The electromagnet 136 is desirably connected to the base 134. Unlike the actuator 120, the actuator 130 in this embodiment preferably includes one or more springs 138 that are attached to the base 134 and to the moving magnet 132 at either end, as shown in the side view of FIG. 7A. The springs 138 are operable to generate forces in a direction that returns the moving mass 132 to a center position, for instance midway between either end of the electromagnet 136.

The springs 138 function to keep the moving mass 132 close to the center position when the actuator power is off, and to provide a restoring force when the moving mass 132 is at one end of travel of the actuator 130. The stiffness of the springs 138 can be selected so that the natural frequency of the actuator 130 increases the amplitude of vibration at desired natural frequencies. This spring effect can be generated from a single spring, from a nonlinear spring, from extension springs, as well as compression springs. A number of such spring configurations which may be employed with the present invention are described in the aforementioned U.S. patent application Ser. No. 11/325,036.

Another embodiment of the linear motion vibration actuator 100 according to aspects of the present invention is shown in FIGS. 8A-B. This embodiment is similar to the embodiments shown in FIGS. 6A-B and 7-B in that actuator 140 includes a moving mass 142 including a permanent magnet, a base 144, and an electromagnet 146 coupled to the base 144 and at least partly surrounding the moving mass 142. The electromagnet 146 may be, e.g., rigidly or semi-rigidly coupled such that a vibration force is transmitted from the actuator 140 to the base 144, for instance to enable a user to perceive the vibration force. In this embodiment, a pair of permanent magnets 148 is attached to the base and are in operative relation to the moving magnet 142 at either end as shown in the side view of FIG. 8A. The permanent magnets 148 have poles, as shown by the N and S in FIG. 8A, which are configured to repel the moving mass 142 and to generate forces in a direction that returns the moving mass 142 to a center position. The permanent magnets 148 function to keep the moving mass 142 close to a center position when the actuator power is off, and to provide a restoring force when the moving mass 142 is at one end of travel of the actuator 140.

The size of the permanent magnets 148 attached to the base 144 can be selected so that the natural frequency of the actuator 140 increases the amplitude of vibration at desired natural frequencies. The actuator 140 may be controlled so that one or more natural frequencies are selected during different modes or times of operation. Use of repulsive magnetic forces as shown in FIG. 8A to generate centering forces on the moving permanent magnet of the moving mass 142 can provide lower friction than use of springs 138 as shown in FIG. 7A, and thus can generate increased actuator efficiency and smoothness. A number of configurations showing use of permanent magnets to center a moving mass, which are suitable for use in the present invention, are described in the aforementioned "Vibration Device" patent application.

Alternative embodiments of linear motion vibration actuators that may also be utilized with the present invention include both springs and magnets, either alone or in combination, that return a moving mass towards the center of range of motion of the actuator.

A further alternative embodiment of the linear motion vibration actuator 100 in accordance with the present invention is shown in FIG. 9. This embodiment comprises actuator 150, which is similar to a solenoid in that it has a ferromagnetic moving plunger 152 for moving relative to a base 154.

The plunger 152 is pulled into an electromagnetic coil 156 when current flows through the coil 156. The coil 156 is coupled to the base 154. A ferromagnetic end piece 158 can be located within or at the end of the coil 156 to increase the force output of the actuator 150. A spring device 160 may be positioned opposite the end piece 158. The spring device 160 is preferably employed to retract the plunger 152 out of the coil 156. As shown in FIG. 9, both an end of the coil 156 and an end of the spring 160 are desirably fixed to the base 154 of the actuator 150. The coil 156 and the spring 160 may be fixed to a single base at different sections thereon, or may be fixed to separate base elements that are coupled together. The current in the coil 156 can be turned on and off to generate a vibration force.

Figure 10:
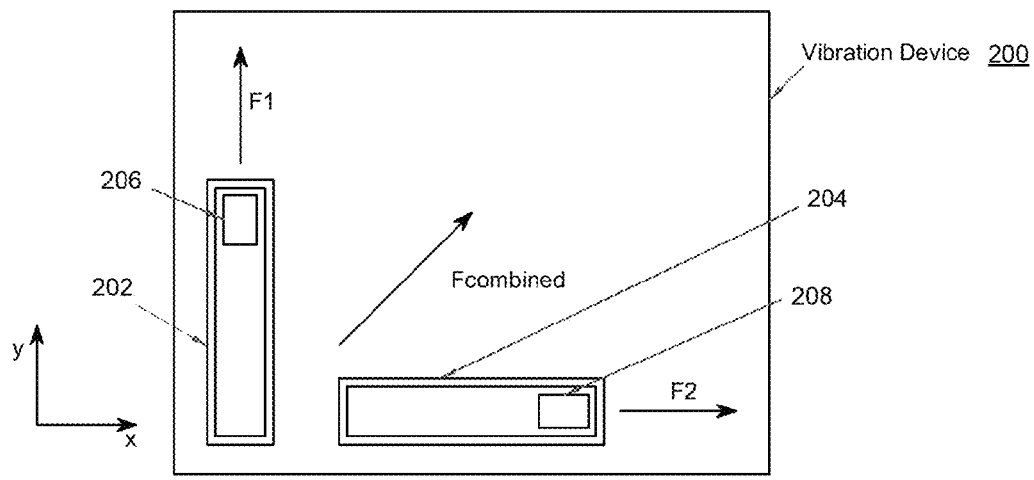
FIG. 10 illustrates a vibration device in accordance with aspects of the present invention.

A preferred embodiment of a vibration device 200 according to the present invention is shown in FIG. 10. In this embodiment, the vibration device 200 preferably includes two linear motion vibration actuators mounted on to it, namely actuator 202 and actuator 204. The actuator 202 includes a moving mass 206 and the actuator 204 includes a moving mass 208. The vibration actuators 202, 204 are attached to the vibration device 200 in a manner that transmits the force from the vibration actuators 202, 204 to the vibration device 200. Preferably the vibration device 200 has an enclosure or base (not shown) to which the vibration actuators 202, 204 are connected.

The vibration actuators 202, 204 are desirably attached in a relatively rigid fashion to the vibration device enclosure or base. Rigid attachment provides a common base to the vibration device 200, upon which forces from both vibration actuators 202, 204 are applied. In this embodiment, the two actuators 202, 204 are mounted at approximately right angles to each other. The force generated by actuator 202 is shown as force vector $F_1$, and the force vector from actuator 204 is shown as $F_2$. As expressed herein, vectors and matrices are designated by bold font and scalars are designated without bolding. The combined force generated by the vibration device 200 is the vector sum of the vibration forces from both of the actuators 202, 204, and is shown in FIG. 10 as vector $F_{combined}$.

The combined force, $F_{combined}$, applied by the vibration actuators 202 and 204 onto the vibration device 200 is a superposition of the vibration forces from each actuator, and is a function of time, t. The force vector can $F_{combined}(t)$ is given by the vector equation:

$$F_{combined}(t) = F_1(t) + F_2(t) \quad (5)$$

where $F_1(t)$ is the force vector from actuator 202 as a function of time, and $F_2(t)$ is the force vector from actuator 204 as a function of time.

Both actuators 202, 204 can be operated in a vibratory fashion. For the case of a sine wave vibration, the actuator forces can be given by:

$$F_1(t) = a_1 A_1 \sin(\omega_1 t + \phi_2) \quad (6)$$

and $$F_2(t) = a_2 A_2 \sin(\omega_2 t + \phi_2) \quad (7)$$

respectively, where $A_1$ and $A_2$ are the respective amplitudes of vibration, $a_1$ and $a_2$ are the unit vectors corresponding to the respective directions of vibration, $\omega_1$ and $\omega_2$ are the respective frequencies of vibration, $\phi_1$ and $\phi_2$ are the respective phase angles, and t is time. Other profile vibrations including square waves, triangle waves, and other profiles can also be implemented with each actuator.

In the example shown in FIG. 10, actuator 202 is aligned with the y axis, and thus the unit vector $a_1$ is represented by:

$$a_1 = \begin{bmatrix} 0 \\ 1 \end{bmatrix} \quad (8)$$

and the unit vector $a_2$ aligned with the x axis and is represented by:

$$a_2 = \begin{bmatrix} 1 \\ 0 \end{bmatrix} \quad (9)$$

The combined force vector, $F_{combined}$, is given by the superposition of forces form the actuators 202 and 204, and thus is given by:

$$F_{combined}(t) = a_1 A_1 \sin(\omega_1 t + \phi_1) + a_2 A_2 \sin(\omega_2 t + \phi_2) \quad (10)$$

It is possible to vibrate actuators 202 and 204 shown in FIG. 10 in a manner that is in-phase and in synchronous vibration. Under such vibration, there will be a single vibration frequency, $\omega$ and a single phase $\phi$ Accordingly, $F_{combined}$ can be given by:

$$F_{combined}(t) = [a_1 A_1 + a_2 A_2] \sin(\omega t + \phi) \quad (11)$$

With such in-phase and synchronous vibration the vibration is synchronized, then the peak forces from both linear motion vibration actuators will occur at the same instances during each cycle of vibration. The net direction of vibration force is the vector combination of $[a_1 A_1 + a_2 A_2]$. Thus, in synchronized vibration and in-phase vibration, the vibration device generates a vibration force at a specified frequency in a specified direction that results from the vector combination of forces from the direction and magnitude of each of the actuators in the device. It is possible to control the magnitude of vibration in each linear motion vibration actuator, and thereby control the net direction of vibration of $F_{combined}$.

In a preferred example, the vibration frequency, $\omega$, phase $\phi$, and waveform of each actuator are substantially identical. For instance, $\omega_2$ may be set to be substantially equal to $\omega_1$ and $\phi_2$ may be set to be substantially equal to $\phi_1$. By way of example only, $\omega_2$ may be set to within 10% of the value of $\omega_1$, more preferably to within 5% of the value of $\omega_1$. Similarly, by way of example only, $\phi_2$ may be set to within 10% of the value of $\omega_1$, more preferably to within 5% of the value of $\phi_1$. In another example, the frequencies and/or phases may be set exactly equal to one another. Alternatively, the frequencies, phases, and/or waveforms of each actuator may be set so that a user would not be able to notice the difference in frequency, phase or waveform. In a further alternative, if the vibration device is used in a haptic application to generate force sensations on the user, small variations may occur which may not be detected by the user or which cannot be significantly felt by the user. In other instances, force sensations in a haptic application or in a vibratory feeder application may vary minutely so that user performance in the haptic application or performance of the vibratory feeder is not significantly changed.

It is also possible to apply equation 11 to a vibration profile/waveform of arbitrary shape. Here, waveform p(t) may be used to represent the waveform shape over time t. A period of vibration may be represented by $p(t) = p(t + nT)$, where n=1, 2, 3, etc. and T is the period of vibration. In this case, an arbitrarily shaped synchronized vibration profile may be represented as:

$$F_{combined}(t) = [a_1(t) A_1(t) + a_2(t) A_2(t)] p(t) \quad (11.1)$$

When the direction of vibration force for each actuator is substantially constant relative to a base member, the arbitrarily shaped synchronized vibration profile may be represented as:

$$F_{combined}(t)=[a_1 A_1(t)+a_2 A_2(t)]p(t) \tag{11.2}$$

Figure 11:
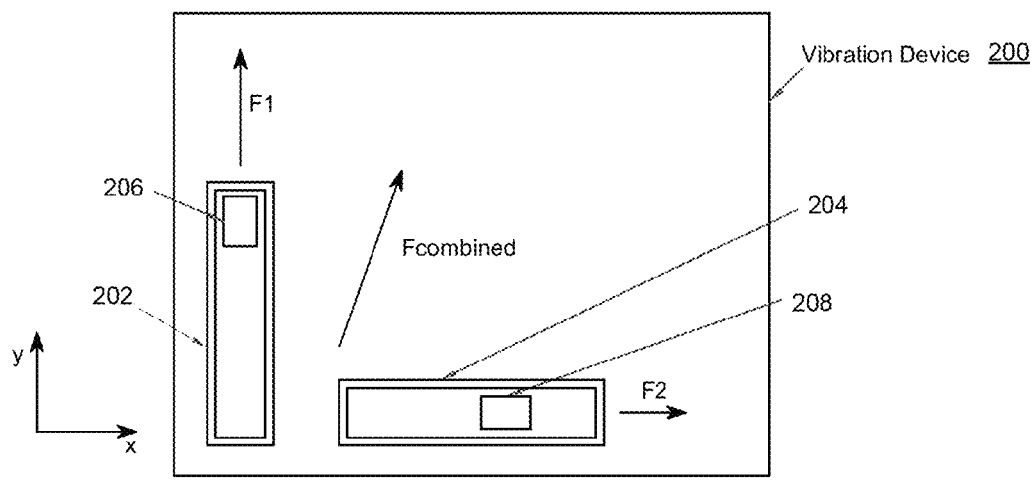
FIG. 11 illustrates the vibration device of FIG. 10 for generating a counterclockwise rotation in accordance with aspects of the present invention.

To illustrate how the direction of $F_{combined}$ can be controlled, the peak magnitudes, $A_1$ and $A_2$, are represented in FIGS. 10 and 11 by the location of the moving masses 206 and 208 within each of the actuators 202 and 204, respectively. In FIG. 10, both actuator 202 and actuator 204 are desirably vibrated at the same amplitude, and the corresponding $F_{combined}$ is at approximately a 45 degree angle between the actuators 202, 204.

By varying the magnitude of the vibration force in the actuators 202, 204, it becomes possible to control the direction of vibration of the combined force effect. In FIG. 11, the actuator 202 is vibrating at peak amplitude as illustrated by the peak position of moving mass 206 at the end of travel limits of actuator 202. However, actuator 204 is vibrating at a lower peak amplitude, as illustrated by the peak position of moving mass 208 closer to the middle of travel limits of actuator 204. The lower peak force is also illustrated in FIG. 11 by the shorter length vector for $F_2$. The direction of the combined force, $F_{combined}$, is the result of vector addition of $F_1$ and $F_2$, and for vibrations illustrated in FIG. 11 is rotated counterclockwise relative to the direction shown in FIG. 10.

Figure 12:
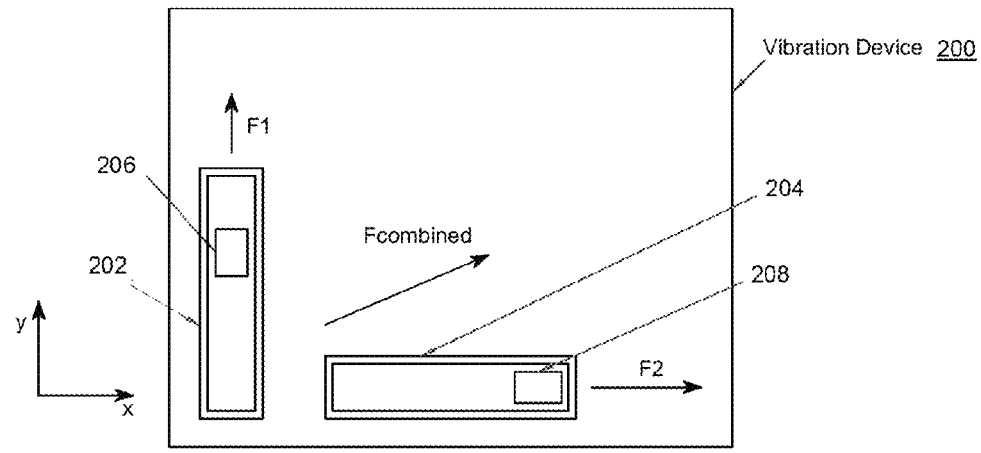
FIG. 12 illustrates the vibration device of FIG. 10 for generating a clockwise rotation in accordance with aspects of the present invention.

In a similar fashion, the direction of combined force can be rotated in the clockwise direction as shown in FIG. 12. The vibration case illustrated in FIG. 12 shows the peak amplitude of vibration of actuator 202 reduced relative to that shown in FIG. 10, while the peak amplitude of actuator 204 remains high. In this case, the vector addition of $F_1$ and $F_2$ results in a clockwise rotation of $F_{combined}$ in FIG. 12 relative to the direction shown in FIG. 10.

Figure 13:
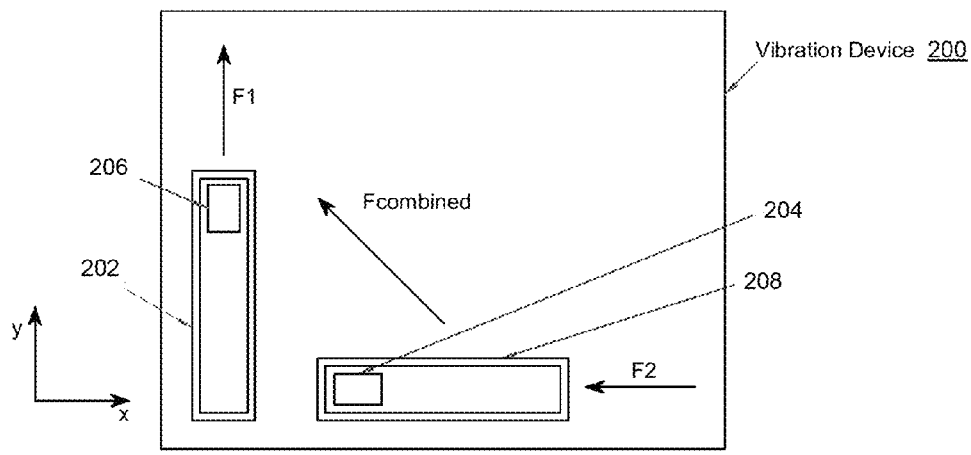
FIG. 13 illustrates the vibration device of FIG. 10 for generating a change in the direction of force in accordance with aspects of the present invention.

It is also possible to change the direction of $F_{combined}$ to an adjacent quadrant. As shown in FIG. 13, the sign of the $F_2$ has changed be in the direction of the negative x axis, relative to the positive x direction that shown in FIG. 10. The change in sign of $F_2$ can be achieved by changing the sign of $A_2$ in equation 11 above. It should be noted that one could achieve a similar representation of the combined force equation by defining actuator 204 vibration as at 180 degrees out of phase of actuator 202. However, changing the sign on the actuators vibration amplitude maintains the form of equation of synchronous vibration shown in equation 11. Thus, vibration that can be represented as 180 degrees out of phase can also be represented as in-phase vibration but with a negative amplitude of vibration.

Figure 14:
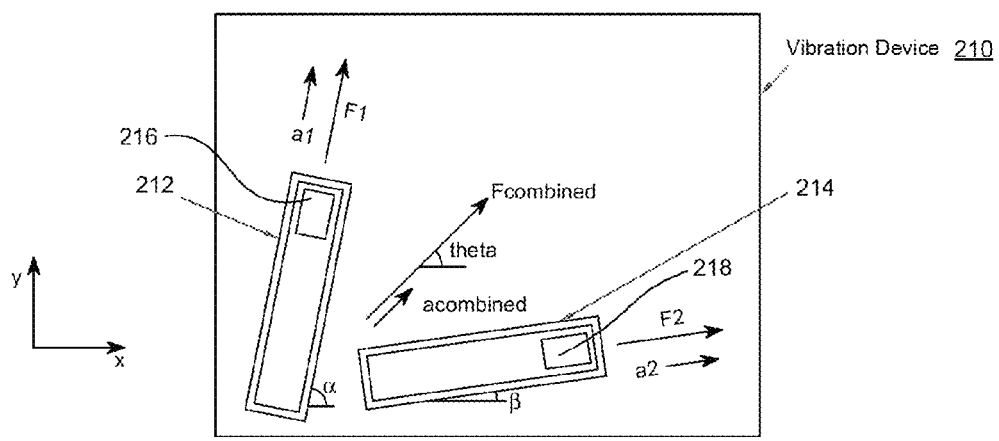
FIG. 14 illustrates a vibration device employing non-orthogonal linear actuators in accordance with aspects of the present invention.

An alternative embodiment of a vibration device in accordance with the present invention is shown in FIG. 14. Here, vibration device 210 includes a first actuator 212 and a second actuator 214, having respective moving masses 216 and 218. FIG. 14 represents a two dimensional embodiment where two linear motion vibration actuators 212, 214 are aligned with an xy plane. In this embodiment, it is not necessary for the actuators 212, 214 to be orthogonal to each other. $A_1$ and $A_2$ are respectively the amplitudes of vibration of actuators 212 and 214, while $a_1$ and $a_2$ are respectively the unit vectors specifying the direction of vibration of actuators 212 and 214. The unit vector $a_1$ is given by:

$$a_1 = \begin{bmatrix} \cos(\alpha) \\ \sin(\alpha) \end{bmatrix} \tag{12}$$

where the angle $\alpha$ describes the orientation of actuator 1 relative to the x axis as shown in FIG. 14. The unit vector $a_2$ is given by:

$$a_2 = \begin{bmatrix} \cos(\beta) \\ \sin(\beta) \end{bmatrix} \tag{13}$$

where the angle $\beta$ describes the orientation of actuator 2 relative to the x axis as shown in FIG. 14.

For a given vibration waveform the maximum magnitude of force vectors, $F_{1,max}$ and $F_{2,max}$, from actuators 212 and 214 in FIG. 14 can be given by equations:

$$F_{1,max}=A_1 a_1 \tag{14}$$

$$F_{2,max}=A_2 a_2 \tag{15}$$

When actuators 212 and 214 are vibrated synchronously and in-phase (e.g. with the same frequency and with zero phase difference), then the maximum force amplitude occurs at the same time. Thus the maximum combined force vector, $F_{combined,max}$, is given though superposition of the force vectors, and is given by:

$$F_{combined,max}=F_{1,max}+F_{2,max} \tag{16}$$

A matrix of actuator directions, $D_L$, can be created where each of its columns is a unit vector that corresponds to the direction of vibration of a linear motion vibration actuator in a vibration device. For a vibration device with two linear motion vibration actuators, such as the one shown in FIG. 14, the matrix $D_L$ is given by:

$$D_L=[a_1|a_2] \tag{17}$$

where $a_1$ and $a_2$ are column vectors.

A matrix representation of the combined force is given by:

$$F_{combined,max} = D_L \begin{bmatrix} A_1 \\ A_2 \end{bmatrix} \tag{18}$$

where $A_1$ and $A_2$ are scalars. For the case of vibration in a plane, the vectors $a_1$ and $a_2$ will be 2×1 vectors and the matrix $D_L$ will be 2×2.

When the direction matrix, $D_L$, is invertible then the amplitude of vibration in the individual actuators that corresponds to a desired combined force vector, $F_{combined}$, is given by:

$$\begin{bmatrix} A_1 \\ A_2 \end{bmatrix} = D^{-1} F_{combined} \tag{19}$$

When the actuators are aligned orthogonally, then the direction matrix, $D_L$, is orthonormal and its inverse is given by its transpose as shown below:

$$D^{-1}=D^T \tag{20}$$

When the direction matrix, $D_L$, in not invertible because there are more vibration actuators than directions of force being controlled, then a pseudo inverse of matrix $D_L$ can be used. For example, if there are 3 vibration actuators in the xy plane, and the control objective is only to control a two dimensional force, the $D_L$ matrix is given by:

$$D_L=[a_1|a_2|a_3] \tag{21}$$

where $a_1$, $a_2$, and $a_3$ are 2×1 column vectors.

The pseudo inverse is described in "*Introduction to Linear Algebra*", 3rd Edition by Gilbert Strang, published in 2003 by Wellesley-Cambridge Press, the entire disclosure of which is incorporated by reference herein.

One method for calculating a pseudo inverse, $D_L^+$, is given by:

$$D_L^+ = D_L^T (D_L D_L^T)^{-1} \tag{22}$$

In such a case the amplitude of vibration for each actuator can be given by:

$$\begin{bmatrix} A_1 \\ A_2 \\ A_3 \end{bmatrix} = D_L^+ F_{combined} \tag{23}$$

It is possible to specify the combined force vector, $F_{combined}$, in terms of a direction of vibration and amplitude. For a two dimensional embodiment the combined amplitude of vibration can be specified by the scalar $A_{combined}$, and the direction of vibration can be specified by an angle, theta, as shown in FIG. 14. In this two dimensional embodiment $F_{combined}$ can be given by:

$$F_{combined} = A_{combined} \begin{bmatrix} \cos(\text{theta}) \\ \sin(\text{theta}) \end{bmatrix} \tag{24}$$

Thus, it can be seen that the amplitudes of vibration, A1 and A2, can be represented in terms of the direction of vibration, theta, combined amplitude of vibration, $A_{combined}$, and direction matrix, $D_L$, as given by:

$$\begin{bmatrix} A_1 \\ A_2 \end{bmatrix} = D_L^{-1} A_{combined} \begin{bmatrix} \cos(\text{theta}) \\ \sin(\text{theta}) \end{bmatrix} \tag{25}$$

Equation 25 provides the scalar magnitude of $A_1$ and $A_2$. When the sign of $A_1$ is different than the sign of $A_2$ then vibration waveform can be generated directly using the results of Eq. Avec. Alternatively, the waveform can be generated using absolute values of $A_1$ and $A_2$ but with one waveform completely out of phase with the other waveform. A sine wave is defined to be completely out of phase when it is 180 degrees out of phase. General waveforms are defined to be completely out of phase when the maximum positive amplitude of vibration of one waveform concedes with the maximum negative amplitude of the other waveform. A depiction of two actuators vibrating completely out of phase is shown in FIG. 13. Two actuators vibrating completely out of phase are also considered to be in synchronized vibration.

It is also possible to specify the combined direction of vibration in terms of a unit vector, $a_{combined}$, as shown in FIG. 14. The vector $F_{combined}$ can be given by:

$$F_{combined} = A_{combined} \times a_{combined} \tag{26}$$

Another configuration according to aspects of the present invention is a three dimensional configuration, where there are at least 3 linear motion vibration actuators as shown in FIG. 15.

In the vibration device 220 of FIG. 15, actuators 222, 224 and 226 each include a moving mass 228, 230 and 232, respectively. The actuators 222, 224 and 226 are preferably orthogonal to each other and aligned with an xyz coordinate system. In an alternative three dimensional embodiment the actuators are not necessarily orthogonal to each other; yet the force vectors of the actuators span the three dimensional vector space. With such an alternative, an arbitrary direction of three dimensional force can be generated. In the three dimensional cases, the combined direction of vibration can be specified by the 3×1 unit vector, $a_{combined}$. The three dimensional combined force can be given by the same equations for the 2 dimensional case, as shown below $$F_{combined} = A_{combined} \times a_{combined} \tag{27}$$

where $a_{combined}$ and $F_{combined}$ are 3 dimensional vectors.

Vibration devices according to the present invention may include an arbitrary number of actuators in arbitrary locations and orientations.

FIG. 16 illustrates a vibration device 240 having a pair of actuators 242 and 244. The actuators 242 and 244 include moving masses 246 and 248, respectively. In this embodiment, vibration device housing 250 is configured as a hand held game controller for computer or video games. Linear motion vibration actuator 242 is shown as being located in the left handle and linear motion vibration actuator 244 is shown as being located in the right handle. The actuators 242 and 244 need not be orthogonal, and need not be in the same plane.

Figure 17:
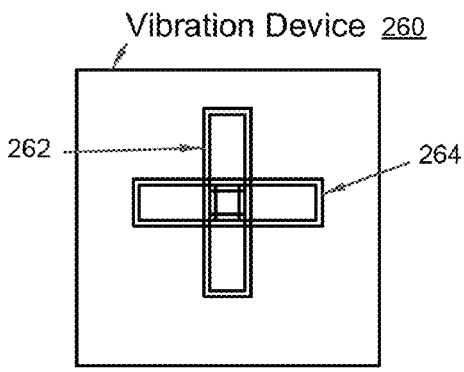
FIG. 17 illustrates a vibration device in accordance with aspects of the present invention.

Another alternative embodiment of a vibration device according to the present invention is shown in FIG. 17, where vibration device 260 includes a first linear motion vibration actuator 262 and a second linear motion vibration actuator 264. As shown, the actuators 262, 264 are located on top of each other. An advantage of such a configuration is that the actuators 262, 264 create little torque about the center of the vibration device 260, which may be desirable in some vibration applications.

Figure 18:
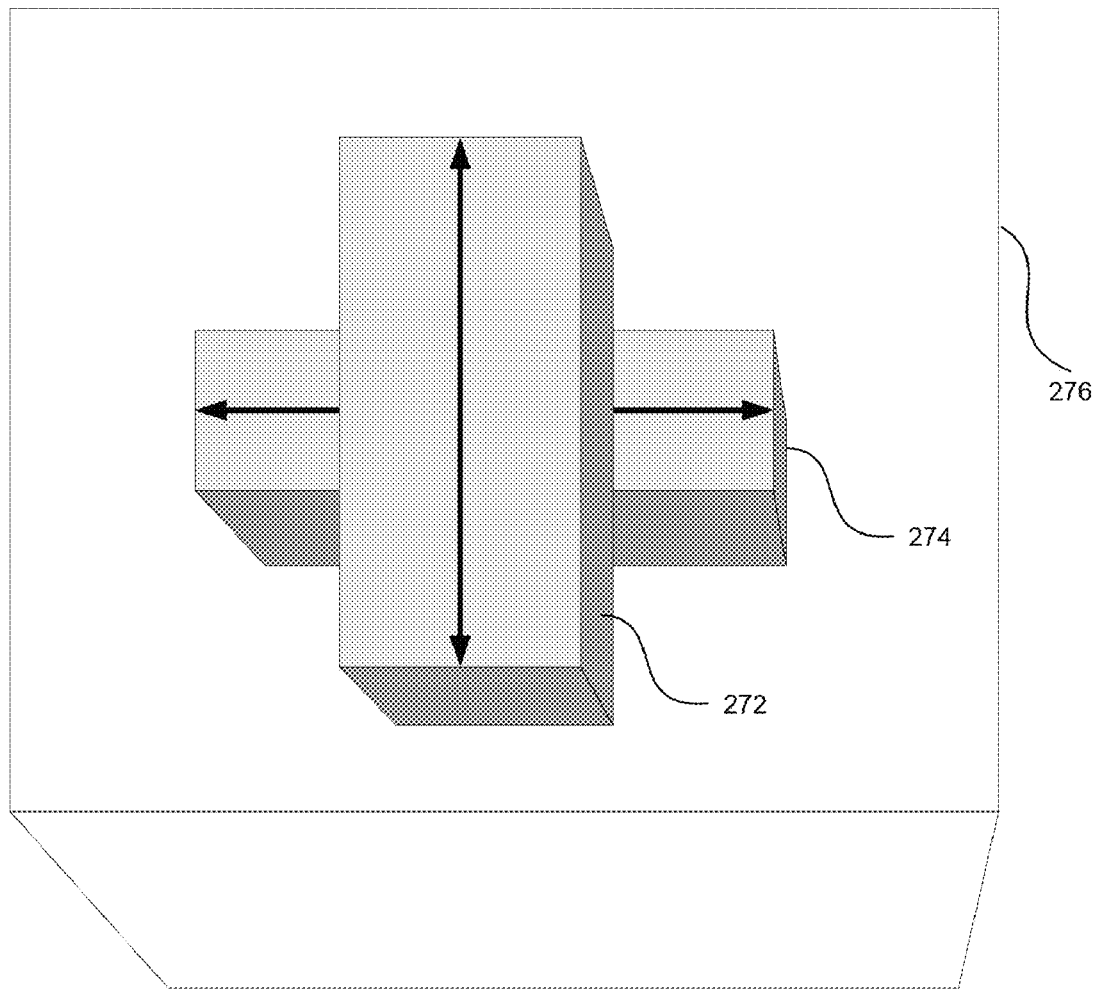
FIG. 18 illustrates another vibration device in accordance with aspects of the present invention.

In a variation of FIG. 17, FIG. 18 illustrates a game controller 270 having two linear actuators, 272 and 274 disposed perpendicular to each other. The actuators 272 and 274 are preferably rigidly mounted to case 276 of a game controller. The actuators 272 and 274 could be mounted in a plane of any angle; however, they are preferably mounted in a horizontal plane of the case 276. The actuators 272 and 274 do not have to be located one on top of the other; rather they can be attached to the same rigid body, such as the case 276 of a game controller. Of course, one could attach three or more linear actuators to the case 276, preferably at right angles to each other to create force vectors than span the three dimensional space of the case 276. Moreover, the actuators do not have to be at right angles to each other. Desirably, the actuators are positioned relative to one another with different orientations.

Figure 19:
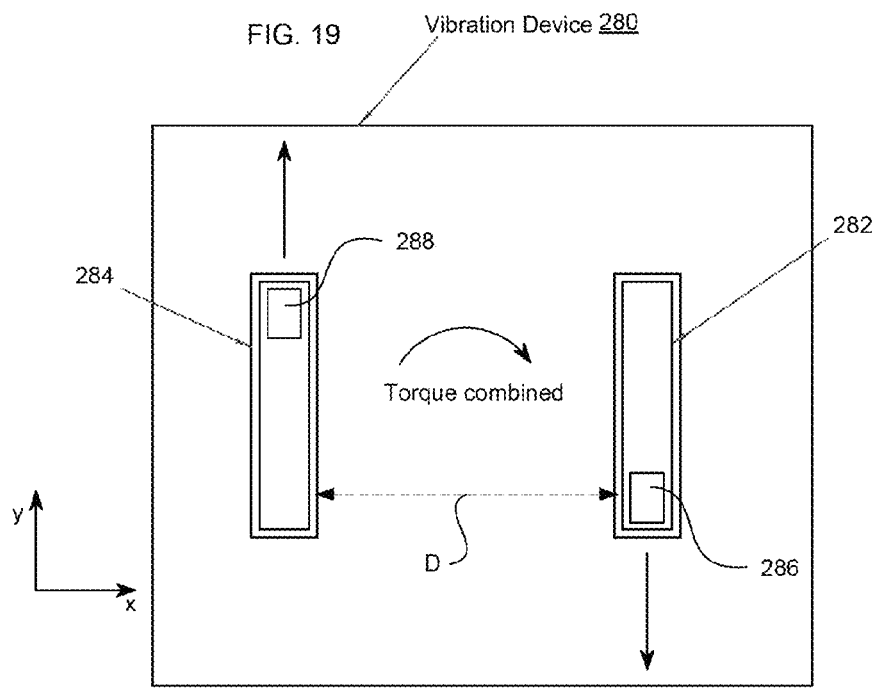
FIG. 19 illustrates a vibration device for generating a combined torque in accordance with aspects of the present invention.

A further embodiment of a vibration device according to the present invention is shown in FIG. 19. Here, vibration device 280 includes two linear motion vibration actuators, 282 and 284, which are aligned in their orientation but separated by a distance D. Actuator 282 includes moving mass 286 and actuator 284 includes moving mass 288. The actuators 282, 284 may be vibrated such that the moving mass 286 in actuator 282 is at a negative extreme along the y axis when the moving mass 288 in actuator 284 has a positive extreme along the y axis. In this fashion the two actuators 282, 284 generate a combined torque when vibrated in a synchronous fashion. The embodiment shown in FIG. 19 could be operated, in one example, such that the moving masses 286 and 288 move in the same direction when synchronized, and thereby generate a combined force along the y axis. In this fashion the configuration shown in FIG. 19 could be used to generate a combined torque, a combined force, or a combination of force and torque.

Figure 20:
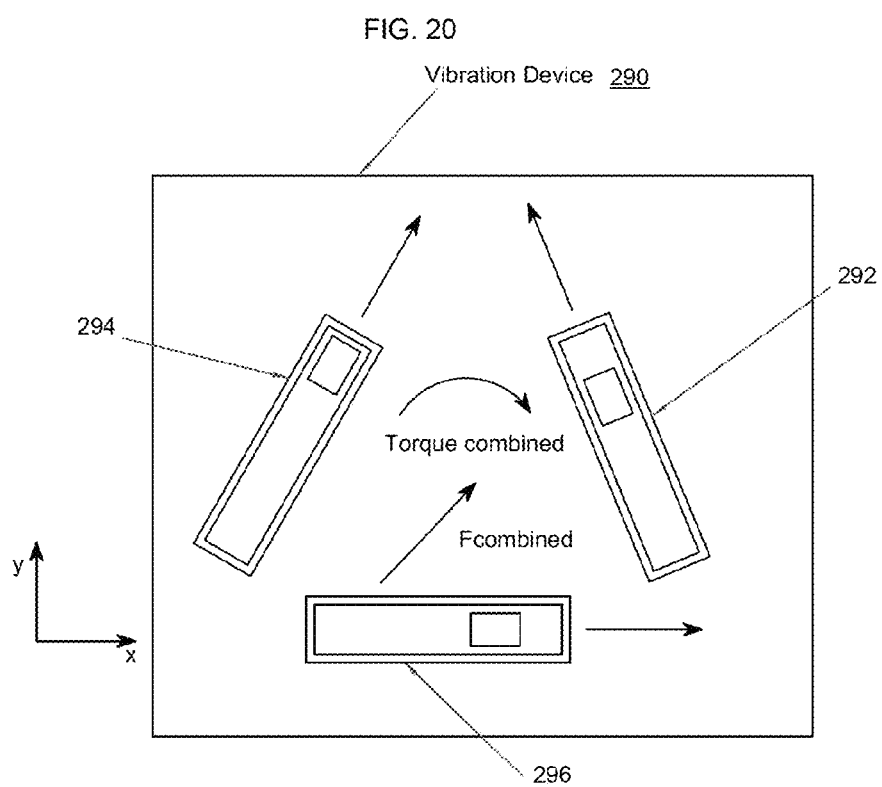
FIG. 20 illustrates another vibration device for generating a combined torque in accordance with aspects of the present invention.

An alternative embodiment of a vibration device 290 in accordance with aspects of the present invention is shown in FIG. 20. Here, three linear motion vibration actuators 292, 294 and 296, each having a moving mass, are orientated on an xy plane. In this embodiment it is possible to generate a combined force and a combined torque. It is also possible to independently control the combine force and torque by modulating the amplitude of vibration in each of the actuators 292, 294 and 296. The combined torque and force are superpositions of the forces and torques generated by each actuator. Since there are three actuators that can be controlled independently, the components of the force along the x axis, the force along the y axis, and the torque about a selected point on the xy plane can all be modulated independently.

In the vibration device embodiments described herein the vibration actuators may be attached to the vibration device in a rigid, a semi-rigid or a non-rigid fashion. Even when vibration actuators are attached in a non-rigid fashion to a vibration device, the vibration device is operable to transmit the superposition of forces from all vibration actuators. When vibration actuators are attached in a rigid fashion to a vibration device, the combined force applied by the vibration device becomes less dependent on the location where the vibration device transmits force and torques to other bodies. In addition, the more rigid the attachment between the vibration actuators and the vibration device, the more uniform the timing of the force superposition becomes at all points of the vibration device.

In an example, it is possible to attach the actuators directly onto a person's hand and body, for instance as shown in U.S. Pat. Nos. 6,275,213 and 6,424,333. In uses of the present invention where actuators are directly attached or indirectly coupled to the hand or body, the vibration force from each actuator may be felt directly at different locations on the body, yet a synchronized combined force vector can still be applied onto the body by synchronizing the operation of the actuators.

Vibration devices in accordance with the present invention can be built with rotary vibration actuators as well as with linear motion vibration actuators. In some cases the cost to manufacture rotary vibration actuators is less than the cost to manufacture linear motion vibration actuators. Thus, if cost is a factor, it may be desirable to utilize rotary vibration actuators in place of or in combination with linear motion vibration actuators. However, in order to generate synchronized vibration with rotary vibration actuators, it is necessary to control the rotary position of the actuators along with the rotary velocity.

A rotary vibration actuator may comprise, for example, a DC motor, a rotary solenoid, a rotary stepper motor, a servo motor, or other type of rotary actuator. One advantage of rotary actuators is their relatively low cost. The servo motor uses a position sensor and/or a velocity sensor for feedback. In some situations the rotary stepper motor may be more desirable because it allows for control of position and velocity without the use of a sensor.

Figure 21:
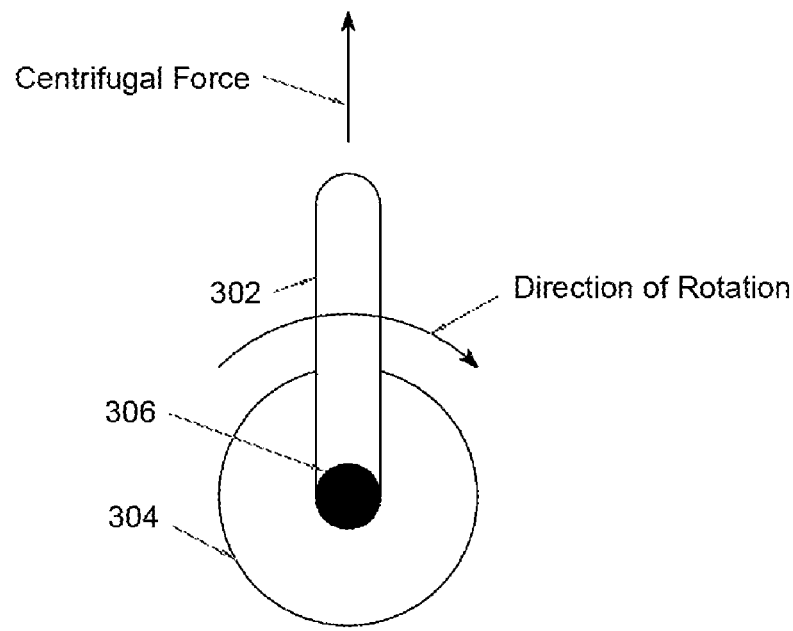
FIG. 21 illustrates a rotary vibration actuator with eccentric mass in accordance with aspects of the present invention.

FIG. 21 shows a rotary vibration actuator 300 suitable for use with the present invention. The actuator 300 includes an eccentric mass 302 coupled to a rotary actuator 304 along a shaft 306. As the rotary actuator 304 is rotated, a centrifugal force is generated in the radial direction aligned with the eccentric mass 302 as shown by the vector CF in FIG. 21.

Many existing vibrators utilize rotary vibration actuators with eccentric masses, but not with synchronized vibration. In accordance with the present invention, a pair of rotary vibration actuators can be configured to achieve a vibration force that is aligned with a single direction of motion. Accordingly, a pair of such rotary actuators can be used when a vibration force in a specified direction is required.

Figure 22:
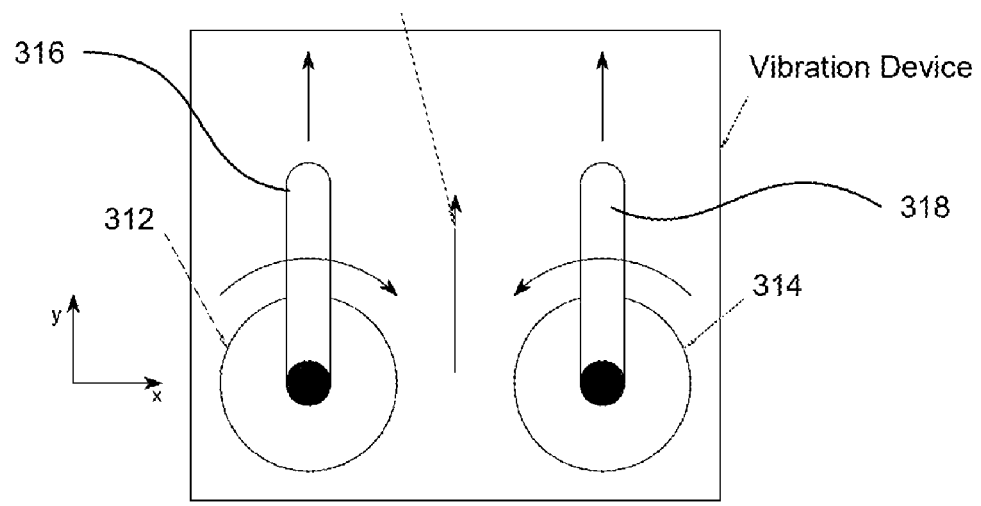
FIG. 22 illustrates a vibration device with a pair of eccentric mass actuators in accordance with aspects of the present invention.

For instance, a vibration device according to the present invention can be built, by way of example only, with two rotary vibration actuators that rotate in opposite directions, as shown in FIG. 22. As shown, the vibration device 310 includes a pair of rotary vibration actuators 312 and 314, each having an eccentric mass 316 and 318, respectively. Actuator 312 preferably rotates clockwise, and actuator 314 preferably rotates counterclockwise. In the orientation shown the centrifugal force vectors from both actuators are aligned with the y axis and superimpose to create a combined force vector, CVF, in the y direction.

With rotary vibration actuators it is possible to create synchronized vibration in an analogous fashion to the synchronized vibration described with linear motion vibration actuators. With rotary vibrating actuators, synchronized vibration is defined to occur where two rotary actuators rotate in approximately the same plane at the same angular velocity in opposite directions, and where the relative angle between the actuators is controlled, such that the actuator centrifugal force vectors align repeatedly in the direction of desired vibration force.

The direction of vibration force can be controlled with a pair of rotary (or rocking) vibration actuators by controlling the angle at which the centrifugal force vectors become aligned. Therefore, it is possible to control the direction of combined force with rotary actuators in a fashion analogous to how the direction of combined force can be controlled with multiple linear vibration actuators.

Figure 23:
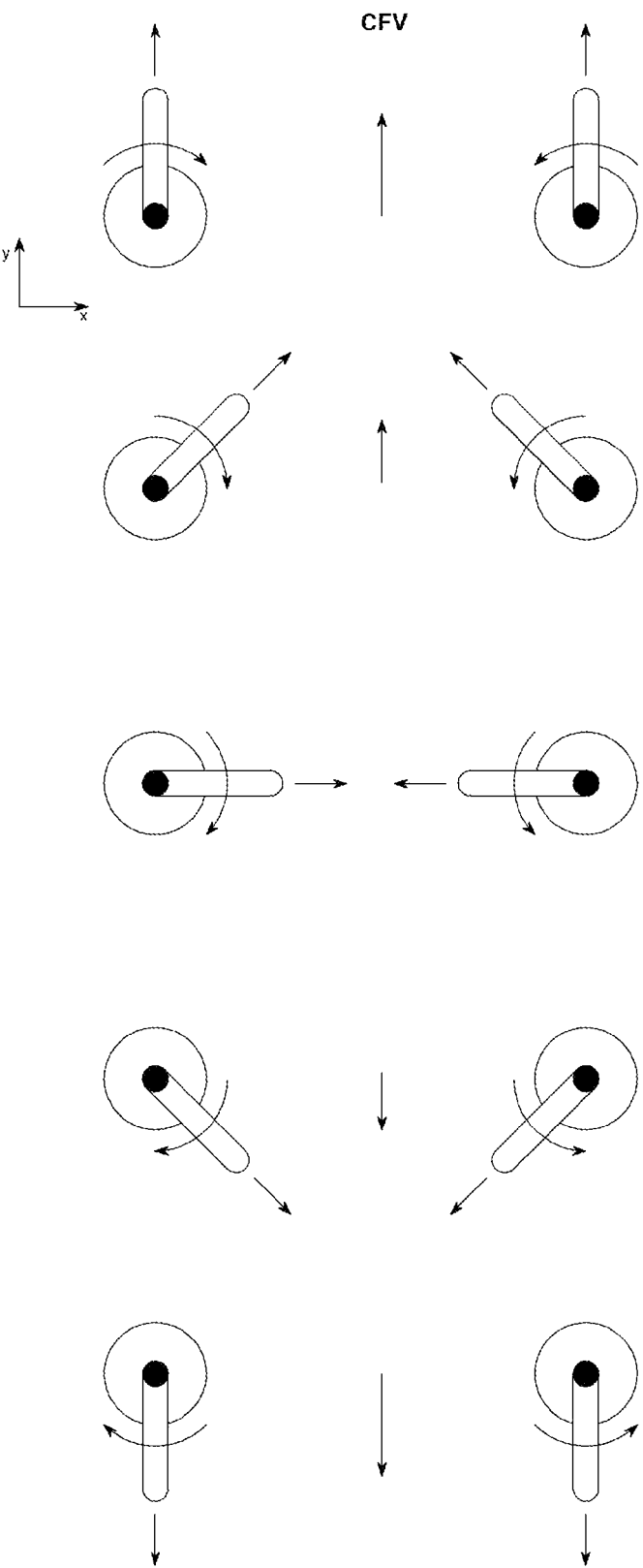
FIG. 23 illustrates synchronous vibration of eccentric mass actuators in accordance with aspects of the present invention.

FIG. 23 shows the embodiment of two rotary vibration actuators as described with respect to FIG. 22, wherein the actuators are controlled in synchronized vibration for a number of positions. As shown in FIG. 23, the combined force vector, CFV, remains in the y axis, and its magnitude changes according to the rotary position of the actuators. The maximum combined force vector occurs when the centrifugal force from both rotary actuators are aligned.

Figure 24A:
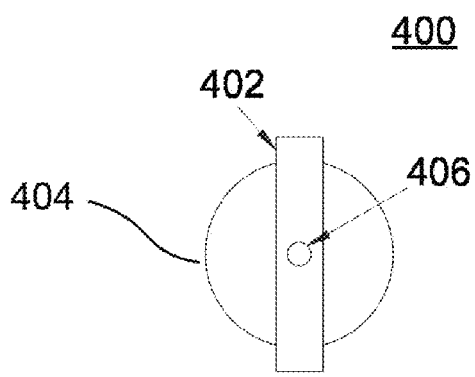
FIGS. 24A-C illustrate a pivoting actuator in accordance with aspects of the present invention.
Figure 24B:
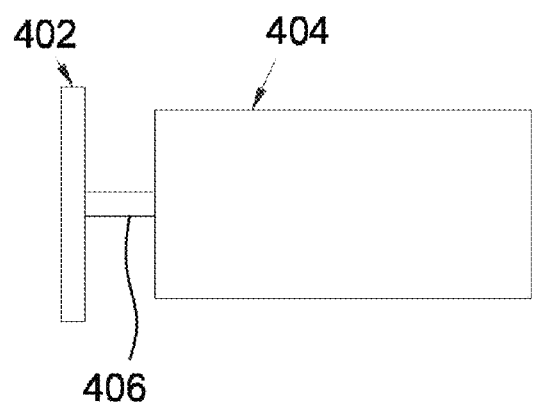
Figure 24C:
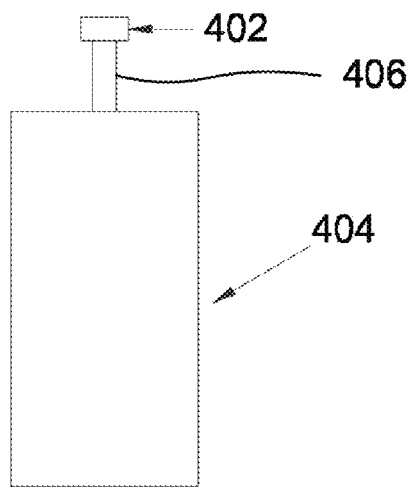

An alternative type of rotary actuator suitable for use with the present invention is a rotary actuator with a pivoting mass. FIGS. 24A-C illustrate respective front, side and bottom views of an exemplary pivoting actuator 400, which includes a mass 402 operable to pivot relative to a rotary actuator 404. The mass 402 is connected to the rotary actuator 404 via a shaft 406. The center of mass of the mass 402 can be located anywhere on the body of the mass 402. Thus, the center of mass may be concentric with the axis of rotation, or eccentric to the axis of rotation. The pivoting actuator 400 may be configured to function in a manner similar to the rotary vibration actuators discussed above.

Figure 25A:
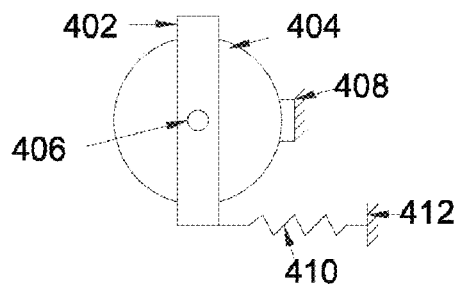
FIGS. 25A-C illustrate another pivoting actuator in accordance with aspects of the present invention.
Figure 25B:
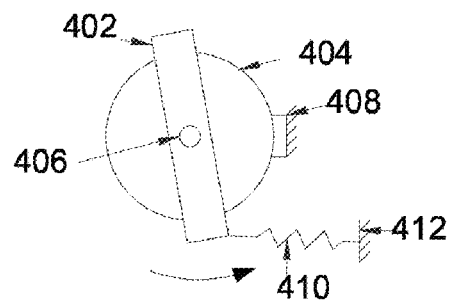
Figure 25C:
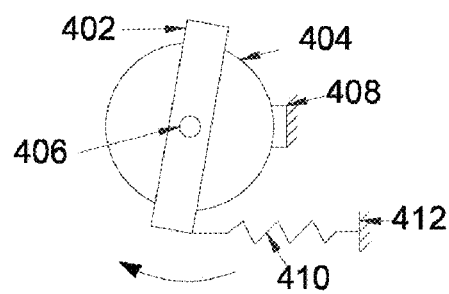

As seen in FIGS. 25A-C, the rotary actuator 404 may be affixed to a support 408, which, in turn, may connect to another object (not shown). Preferably a spring device 410 couples the pivoting mass 402 to a support 412, which may be the same or a different support than the support 408. FIG. 25A illustrates the pivoting actuator 400 when the spring device 410 is in a rest state when the pivoting mass 402 is in a central position.

The mass 402 may pivot in either a clockwise or counterclockwise manner. FIG. 25B illustrates counterclockwise operation. Here, the spring device 410 is in a compressed state. In the present embodiment as shown, the spring device 410 is under a compression force that is primarily linear and is applied toward the right hand side of the figure. FIG. 25C illustrates clockwise operation of the mass 402. Here, the spring device 410 is in an uncompressed state in response to a force that is primarily linear and is applied toward the left hand side of the figure.

Vibration forces and/or torques can be generated with the pivoting actuator 400 as shown in FIGS. 25A-C. The pivoting actuator 400 can be activated to pivot the pivoting mass 402 first clockwise and then counterclockwise, or vice versa. As the pivoting mass 402 rocks back and forth, the spring device 410 generates a vibration force, a torque, or both a vibration force and torque onto the object to which it is affixed via the support 408. In this fashion, if the pivoting mass 402 has a center of mass concentric with the axis of rotation, the pivoting mass 402 can be used to generate a vibration torque. Also in this fashion, if the pivoting mass 402 has a center of mass eccentric with the axis of rotation, the pivoting mass 402 can be used to generate a vibration force.

Vibration forces and/or torques can be generated by moving a mass back and forth. It is possible to define the beginning of a vibration waveform as an instance at which a mass reverses its direction of motion. For linear actuators, the reversal of direction is a reversal of translation. For rotary actuators, the reversal of direction is a reversal of rotation. In general, the reversal of motion of a mass in an actuator may include both translation and rotation.

In actuators having a spring device attached to a moving mass, energy can be built up in the spring device, especially when the mass is moved back and forth close to a natural frequency of the mass and spring system. In such cases, the maximum vibration force can occur at the maximum deformation of the spring device, which can occur when the mass reaches its maximum excursion and reverses its direction. Accordingly, moving masses in two (or more) actuators that are operating in synchronized vibration, can reverse direction at approximately the same time.

An alternative method for generating vibration would be to operate the pivoting actuator 400 in a clockwise (or counterclockwise) direction and then deactivate the pivoting actuator 400 while allowing the spring device 410 to rotate the pivoting mass 402 in the counterclockwise (or clockwise) direction. This approach would allow one to use pivoting actuators and control circuitry that only operates in a single direction.

Figure 26:
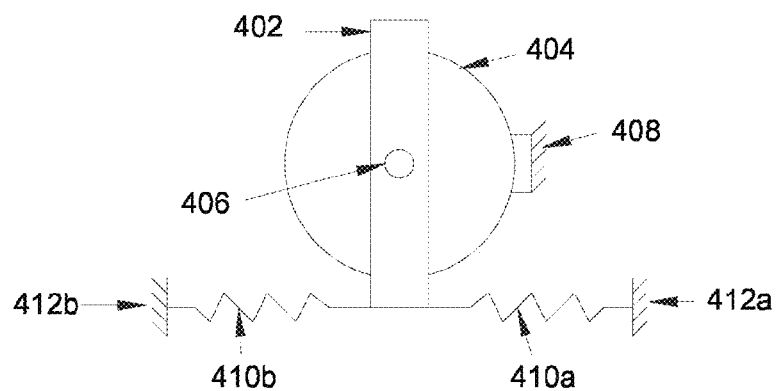
FIG. 26 illustrates a pivoting actuator utilizing a pair of spring devices in accordance with aspects of the present invention.

FIG. 26 illustrates a variation of the pivoting actuator 400, namely pivoting actuator 400', which desirably includes the pivoting mass 402 operable to pivot relative to the rotary actuator 404, and which is connected thereto via the shaft 406. As above, the rotary actuator 404 may be affixed to the support 408, which, in turn, may connect to another object (not shown). Preferably a first spring device 410a couples the pivoting mass 402 to a first support 412a, and a second spring device 410b also couples the pivoting mass 402 to a second support 412b. The supports 412a and 412b may be a single support, separate supports that are physically connected, or physically disconnected supports. One or both of the supports 412a,b may be the same or a different support than the support 408.

One type of pivoting actuator 400 that could be employed is a DC motor. However, not all the components of the DC motor are necessary for this application, because the output shaft does not rotate continuously. Accordingly it is not necessary to have motor brushes, which can reduce cost as well as electrical power losses and frictional losses. In a preferred example, the pivoting actuator 400 may essentially include a stator and a rotor. The stator may be stationary and desirably contains permanent magnets and/or electromagnets. The rotor is operable to pivot and can contain permanent magnets and/or electromagnets. The polarity of the magnets in the stator and rotor can be configured so that activation of the electromagnets causes an electromagnetic torque to be exerted onto the rotating mass 402.

In the embodiment of FIGS. 25A-C, the spring device 410 is configured to operate in a generally linear fashion. However, In order to generate large magnitude of vibration forces with small actuators, it can be advantageous to utilize the resonance of a system. The embodiments shown in FIGS. 25A-C have both a mass and a spring, and thus have a resonant frequency. If the actuator is excited at or close to this resonant frequency large amplitude vibrations can build up. However, it can be desirable to operate the vibration device at a range of frequencies. It is possible for a device to have a variable resonant frequency with use of nonlinear spring forces, as discussed in the aforementioned "Vibration Device" patent application. Accordingly, one could use a nonlinear spring in the vibration device to achieve larger amplitude of vibration over a range of frequencies.

It is possible to generate nonlinear spring force, even with use of a linear spring element. Consider the embodiment shown in FIG. 27A. Here, pivoting actuator 420 has a mass 422 operable to pivot relative to a rotary actuator 424. The mass 422 is connected to the rotary actuator 424 via a shaft 426. The rotary actuator 424 may be affixed to a support 427, which, in turn, may connect to another object (not shown). Preferably a spring device 428 couples the pivoting mass 422 to a support 427', which may be the same or a different support than the support 427.

As shown in FIG. 27A, the spring device 428 is desirably placed in-line with the pivoting mass axis. When the pivoting mass 422 is rotated a small amount about the center position very little lengthening occurs in the spring device 428. Accordingly, the effective spring constant is low and the resonant frequency is low.

Low frequency operation is desirable in some situations, for instance in games that have low frequency effects. For instance, games may generate actions or events in the sub-200 Hertz range, such as between 15 and 150 Hertz. In certain cases the actions or events may be as low as 20-50 Hertz or lower, such as about 10-20 Hertz. Examples of such actions/events include gunshots, automobile related sounds such as a car spinning out of control, and helicopter related sounds such as the whirring of the rotor blades. Eccentric mass actuators may not be suitable to generate a haptic sensation in this frequency range, but pivoting actuators or linear actuators may generate such frequencies.

As the magnitude of rotation of the pivoting mass 422 increases, the lengthening of the spring device 428 increases as shown in FIGS. 27B and 27C. Accordingly, for larger amplitudes of rotation, the effective spring constant is higher and the natural frequency of the system is higher. In order to quickly ramp up the vibration amplitude when a nonlinear spring force is used, the excitation frequency can be varied so that it always matches the natural frequency of the vibration device.

FIG. 27D illustrates a rotating actuator 430 having a rotating mass 432 coupled to rotary actuator 434 via shaft 436. The rotary actuator 434 is desirably coupled to a support 437, which, in turn, may connect to another object (not shown). In this alternative, a spring device such as a torsion spring 438 is attached between the rotating mass 432 and the rotary actuator 434. As shown, one end or tang 439a of the torsion spring 438 is attached to the rotating mass 432, and the other end or tang 439b is attached to the support 437 (or, alternatively, to the rotary actuator 434 itself). Torsion spring 438 may be employed because such spring devices permit a large degree of rotation of the rotating mass 432 relative to the rotary actuator 434 and the support 437.

FIGS. 27E and 27F illustrate a further rotating actuator, namely rotating actuator 440. The rotating actuator 440 includes a rotating mass 442 having a slot 443 therein, a rotary actuator 444, and a shaft 446 coupling the rotating mass 442 to the rotary actuator 444. The rotary actuator 444 is desirably coupled to a support 447, which, in turn, may connect to another object (not shown). In this embodiment a pin 445 is held within the slot 443. A spring device 448 is coupled at one end or tang 449a to the pin 445. The spring device 448 is coupled at the other end or tang 449b to a support 447'. The support 447' is preferably different from the support 447, or, alternatively, is preferably a different section of the support 447 from where the rotary actuator is coupled.

FIG. 27E shows the spring device 448 in a "rest" position. FIG. 27F shows the spring device 448 in a "compressed" position. Here, by way of example only, the rotating mass 442 may be rotating in a clockwise direction. As the rotating mass 442 rotates, the pin 445 moves relative to the slot 443, but the spring device 448 remains in substantially the same orientation relative to the support 447'. In this fashion, the force applied onto the fixed 447' remains in relatively the same direction as the moving mass 442 rotates. It is possible to incorporate a gap between the slot 443 and the pin 445 that would allow for some rotation of the shaft 446 before the spring device 448 is extended or compressed from its rest position. The gap would create a non-linear force effect on the rotating mass 442, which could aid in increasing the magnitude of vibration. The gap would allow the shaft 446 to more quickly reach higher speeds and for the rotating actuator 440 to more quickly build up rotating inertia.

While several types of actuators have been described above that may be used with the present invention, other types of actuators may also be employed so long as they can be controlled as described herein. For instance, piezoelectric devices without separate or distinct "moving" and "stationary" masses may be employed either alone or in combination with other actuator types to impart vibratory forces in the manners described herein.

Figure 28:
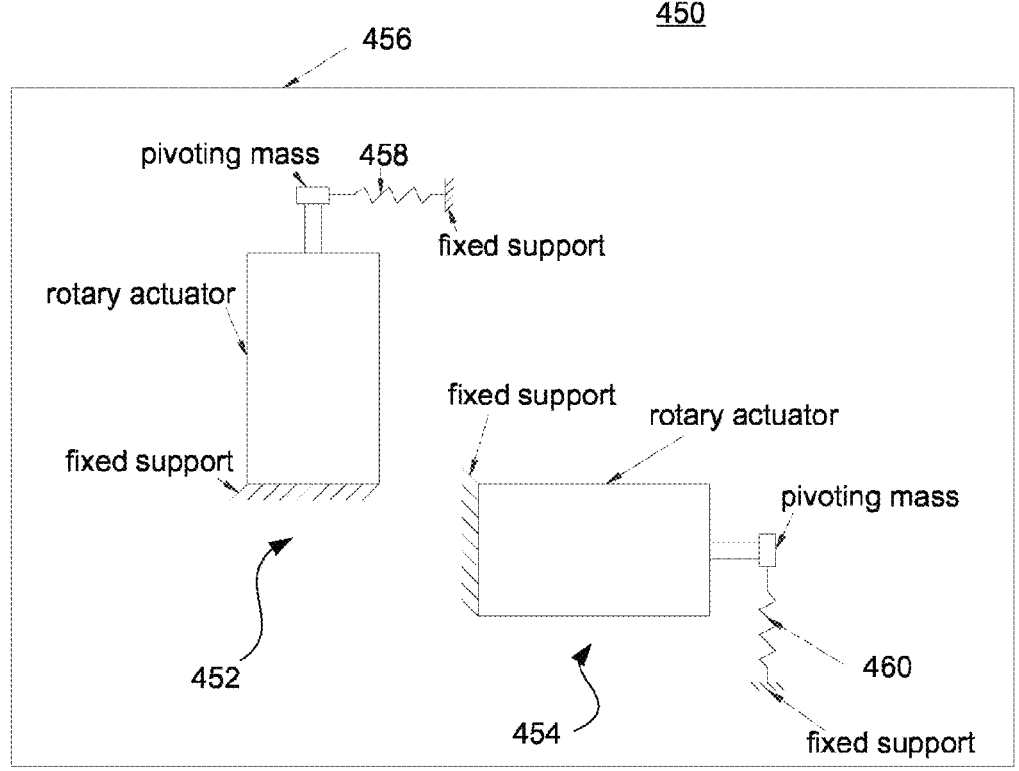
FIG. 28 illustrates a synchronized vibration system employing rotary actuators in accordance with aspects of the present invention.

FIG. 28 illustrates a synchronized vibration system 450, which may comprise two vibration devices 452 and 454, such as any of those of FIGS. 24A-C, 25A-C, 26 and/or 27A-F. Of course, more that two vibration devices may be provided. The vibration devices 452 and 454 are preferably mounted onto a base plate 456 in a generally orthogonal manner as shown, although orthogonality is not required. The vibration device 452 is preferably a horizontal vibrator that desirably has a spring device 458 which applies primarily horizontal forces onto the base plate 456. The vibration device 454 is preferably a vertical vibrator that desirably has a spring device 460 that applies primarily vertical forces onto the base plate 456. As long as the directions of the vibration forces of the different vibration devices are not aligned, it is possible to control the combined direction of vibration using the synchronized vibration methods as described herein as well as in the aforementioned "Vibration Device" patent application.

An alternative embodiment of the present invention includes two rotary vibration actuators whose planes of vibration are not the same; however, in this case the two planes are not orthogonal to each other. In this embodiment, the component of centrifugal force from one actuator that can be projected onto the plane of the other actuator can be used to achieve a component of synchronous vibration.

Figure 29A:
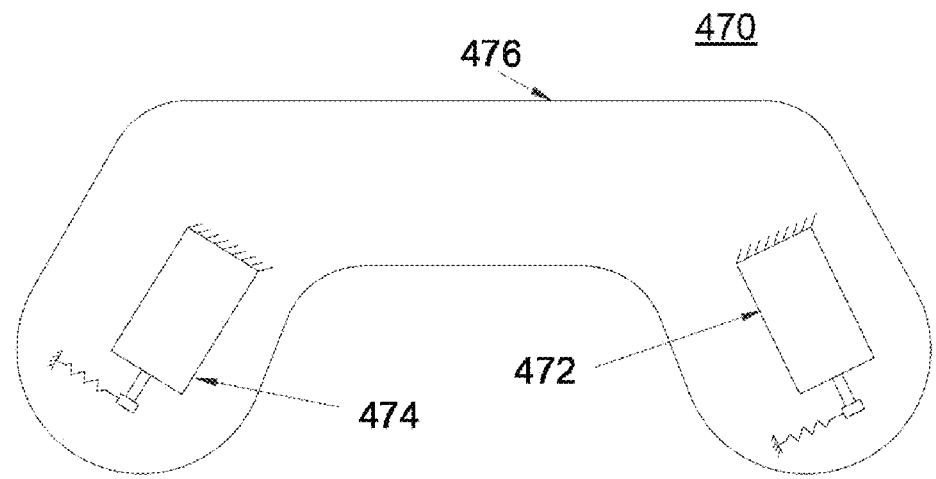
FIGS. 29A-B illustrate game controllers in accordance with aspects of the present invention.

In one example, two or more vibration devices may be mounted devices into a game controller, as shown in FIG. 29A. Here, a game controller 470 includes a pair of vibration devices 472 and 474 mounted in both the right and left handles, respectively, of housing 476. The directions of vibration of the vibration devices 472 and 474 are preferably not aligned, and thus it is possible to control the direction of vibration using the synchronized vibration approach discussed herein.

Figure 29B:
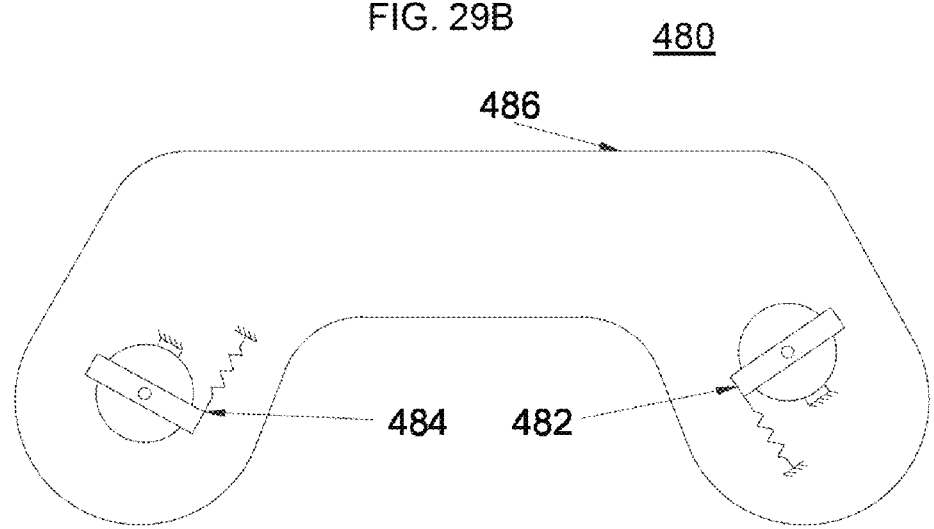

There are many orientations of both the rotary actuators and springs that can be used to achieve an embodiment where synchronized vibration is possible. For instance, the axis of rotation of both actuators can be aligned while the spring direction can vary, allowing an alternative configuration for synchronized vibration. FIG. 29B illustrates a game controller 480 having a pair of vibration devices 482 and 484 within a housing 486 where the axes of the rotating shafts in both rotary actuators are aligned, yet the spring forces are not aligned.

FIG. 30 illustrates yet another variation similar to the rotary and pivoting vibration devices. Here, a rocking actuator 490 preferably includes a rocking weight 492 rotatable about a shaft 494. Desirably, one end of the rocking weight 492 is operatively coupled via a first spring device 496a to a first support 498a. The same end of the rocking weight 492 is also desirably operatively coupled via a second spring device 496b to a second support 498b. The supports 498a and 498b may be a single support, separate supports that are physically connected, or physically disconnected supports. The rocking actuator 490 may be implemented in a device such as a game controller in any of the configuration described above.

A controller for synchronized vibration of a pair of rotary vibration actuators specifies the angular position of each rotating shaft, such that the angle where the centrifugal force vectors are aligned is the desired direction of force vibration and the angular position is incremented such that the rotational velocity matches the desired vibration frequency.

Figure 31:
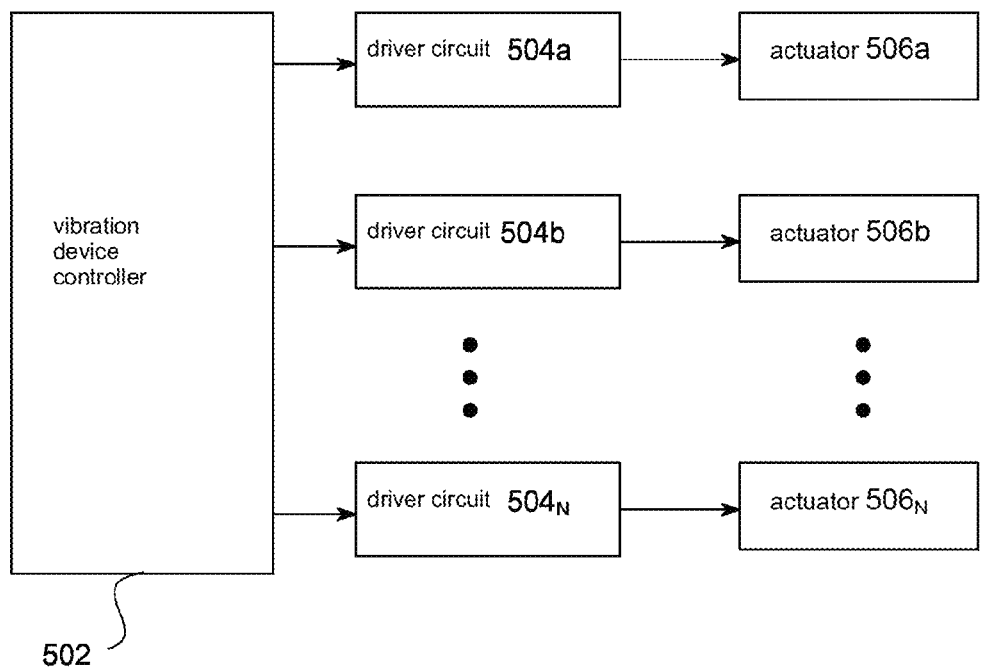
FIG. 31 illustrates a vibration system in accordance with aspects of the present invention.

A system 500 having a controller for one or more vibration devices that use linear motion vibration actuators is shown in FIG. 31. Vibration device controller 502 specifies the desired vibration effect and one or more driver circuit(s) 504a, 504b, ..., 504$_N$ provide the necessary power to actuators 506a, 506b, ..., 506$_N$. While each actuator 506 is shown as being powered by a separate driver circuit 504, it is possible for multiple actuators 506 to be driven by one driver circuit 504.

The controller 502 may be, by way of example only, a microprocessor and the driver circuit(s) 504 may be, for instance, one or more electrical amplifiers. The controller 502 and drive circuit 504 may be integrated into a single microprocessor or single electrical circuit. The control method in this figure is for a configuration with N actuators, where N is an arbitrary number of actuators. Some of the figures showing various control methods in the instant application illustrate only two actuators. However, it should be understood that control methods according to the present invention can be extended to include an arbitrary number of actuators, as shown in FIG. 31.

Figure 32:
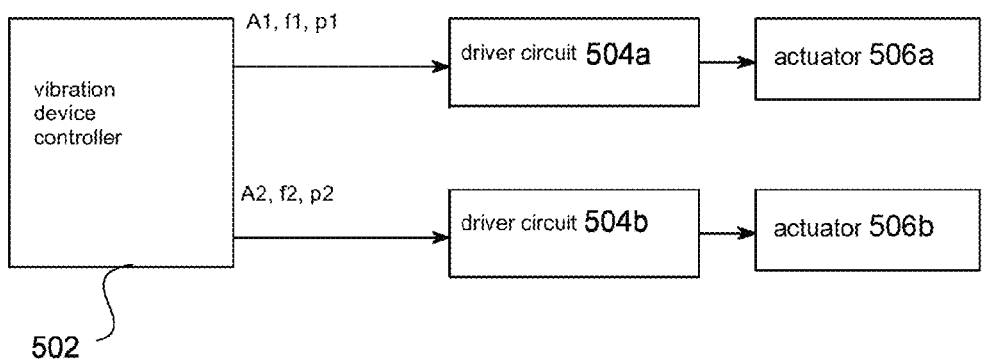
FIG. 32 illustrates control of a vibration system in accordance with aspects of the present invention.

FIG. 32 shows a control method for two actuators. Here the controller 502 specifies the desired vibration amplitude, A, frequency, f, and phase, p, for each actuator 506. The amplitude, frequency, and phase of actuator 506a (A1, f1, p1) may differ from the amplitude, frequency, and phase of actuator 506b (A2, f2, p2). The profile/waveform of the desired vibration force may be a sine wave, square wave, triangle wave, or other profile, such as is discussed above with regard to FIG. 1. The actual vibration profiles/waveforms of the actuators 506a,b may differ from the desired vibration profiles due the dynamics of the drive circuits 504a,b and actuators 506a,b.

Figure 33:
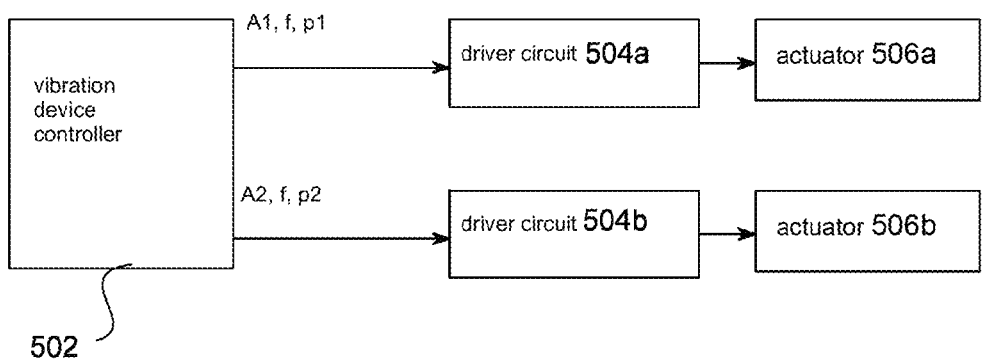
FIG. 33 illustrates control of a vibration system in accordance with aspects of the present invention.
Figure 34:
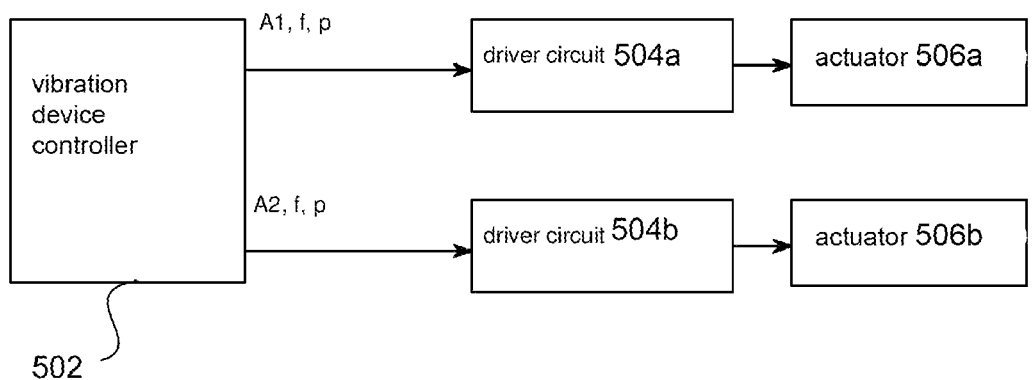
FIG. 34 illustrates control of a vibration system in accordance with aspects of the present invention.

FIG. 33 shows a control method where the frequency of vibration, f, is the same for both actuators 506a,b. FIG. 34 shows a control method where the frequency of vibration, f, and the phase of vibration, p, are the same for both actuators 506a,b. In this embodiment, the actuators 506a,b are desirably driven synchronously such that the peak amplitude of vibration will occur approximately at the same time for both actuators 506$a,b$. The amplitude of vibration may differ between the actuators 506$a,b$.

Figure 35:
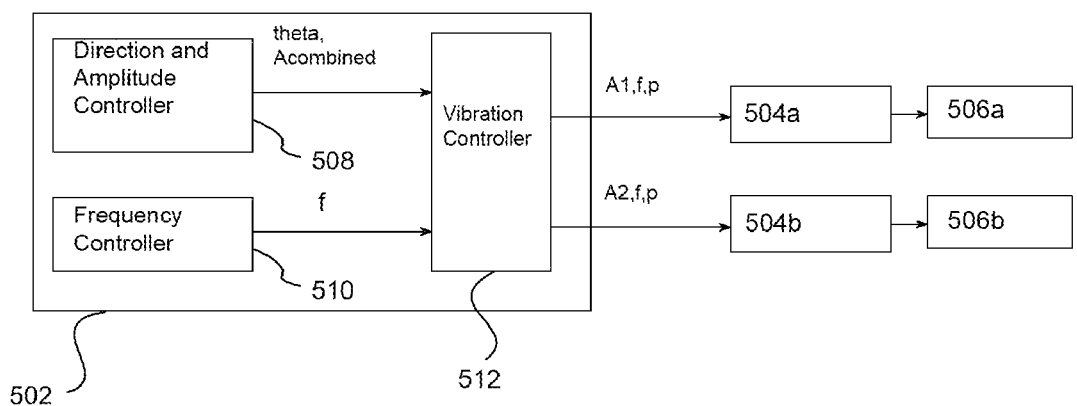
FIG. 35 illustrates a vibration system in accordance with aspects of the present invention.

FIG. 35 shows a control embodiment in accordance with the present invention where the vibration device controller 502 includes an internal direction and amplitude controller 508, an internal frequency controller 510, and an internal vibration controller 512. The direction and amplitude controller 508 desirably specifies the combined vibration amplitude, $A_{combined}$, and the direction of vibration theta. The frequency controller 510 desirably specifies the vibration frequency, f. The vibration controller 512 uses the inputs of theta, $A_{combined}$, and f to output vibration commands to the individual actuators 506$a,b$. The vibration controller 512 is operable to output various waveforms including sine waves, square waves, triangle waves, or other profiles as discussed herein.

The output from the vibration device controller 502 shown in FIG. 35 provides the magnitude of vibration as a function of time to each drive circuit 504$a,b$. In the case where the profile of vibration is a sine wave, the amplitude of vibration for each actuator as a function of time is given by the equation shown below:

$$\begin{bmatrix} A_1(t) \\ A_2(t) \end{bmatrix} = D^{-1} A combined \begin{bmatrix} \cos(\text{theta}) \\ \sin(\text{theta}) \end{bmatrix} \sin(\omega t + p) \qquad (28)$$

Here, t is time and $\omega$ is the vibration frequency in radians per second. The parameter p is the phase of vibration and may be set to zero. The value of $\omega$ in terms of frequency f in vibrations per second is given by $\omega = 2\pi f$.

When the vibration actuators have a linear relationship between the command magnitude and the magnitude of vibration, the output $A_1(t)$ and $A_2(t)$ from equation 28 can be applied directly to the vibration actuators to generate a combined vibration direction corresponding to the angle theta. However some vibration actuators may have a nonlinear relationship between the command magnitude and the magnitude of vibration. For such nonlinear actuators it is possible to generate vibration in the direction theta by using a linearization function that adjusts the magnitude of $A_1$ and $A_2$ to compensate for the nonlinearity of the actuator, as shown in the following equation.

$$\begin{bmatrix} A_1(t) \\ A_2(t) \end{bmatrix} = \qquad (29)$$

$$\text{linearization\_function}\left\{ D^{-1} A_{combined} \begin{bmatrix} \cos(\text{theta}) \\ \sin(\text{theta}) \end{bmatrix} \sin(\omega t + p) \right\}$$

The linearization equation described above can be a lookup table or a scaling algorithm or other type of function.

The ability to control the direction of vibration over time, such as though use of equations 28 and 29, is an important advantage of the present invention. The ability to control vibration direction can be used in vibratory feeders to direct parts in a desired direction. In addition, there are numerous advantages of using the invention for haptic devices as described herein.

Figure 36A:
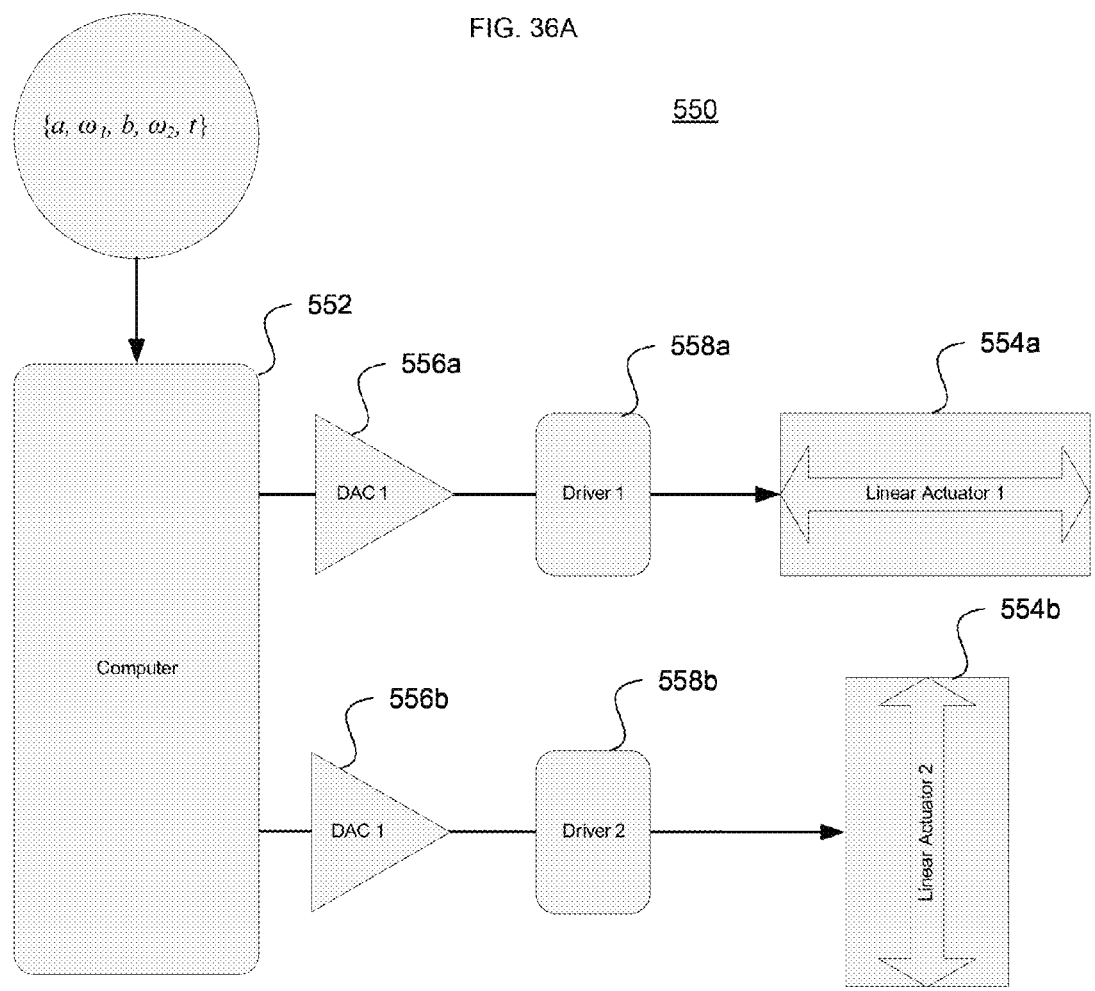

FIG. 36A illustrates a system 550 showing the input of various input parameters of amplitude, phase and position (or time) for a pair of linear actuators. A computer 552 receives input of the parameters, which are preferably entered using a computer keyboard (not shown); however, the parameters also could be input using a graphical user interface, analog potentiometers, or many other means generally known to those skilled in the art. The appropriate output waveforms for linear actuators 554$a$ and 554$b$ are then computed using the computer 552. Each waveform is preferably independent. While computation may be performed using an analog computer, a digital computer is preferred.

If a digital computer is used, the digital output for each actuator 554$a,b$ is then preferably fed into respective digital-to-analog ("DAC") converters 556$a$ and 556$b$, which convert the output to the appropriate analog waveform. The analog waveforms are then fed into the appropriate driver circuits 558$a$ and 558$b$. Those skilled in the art could use other means to modulate the linear vibrations of each actuator 554$a$ and 554$b$, for example via pulse width modulated ("PWM"). Varying the parameters produces an extremely broad range and rich set of haptic sensations for the end user.

In addition to creating varying force effects, one could control the direction of vibration—that is to say the direction of vibration could remain stationary. The resultant force effects can be of lower frequency than the frequency of vibration.

There are also useful applications for generating precise patterns of vibrations from simple parameters. Such patterns include circles, ellipses and straight lines. Furthermore, the amplitude and duration of the patterns may be precisely controlled over time. Moreover, a sequence of patterns may be generated as desired.

FIG. 36B illustrates the system 550 where the input of various input parameters includes input of pattern number, amplitude, duration and start-time for the vibration device using compound vibrations. The parameters are preferably entered using a computer keyboard. The appropriate output waveforms for each linear actuator are then computed at computer 552. As described above, the digital output for each actuator 554$a$ and 554$b$ is then fed into DACs 556$a$ and 556$b$ for conversion to the appropriate analog waveforms. The waveforms are then fed into the driver circuits 558$a$ and 558$b$. Again, the various parameters produce an extremely broad and rich set of haptic sensations for the end user.

Each of the vibration devices described herein according to the present invention can be used as a haptic interface. Haptic interfaces provide force sensation to a user. Haptic interfaces include computer gaming controllers, robot controllers, surgical tool controllers, as well as other devices where a force sensation is provided to a user.

Figure 37:
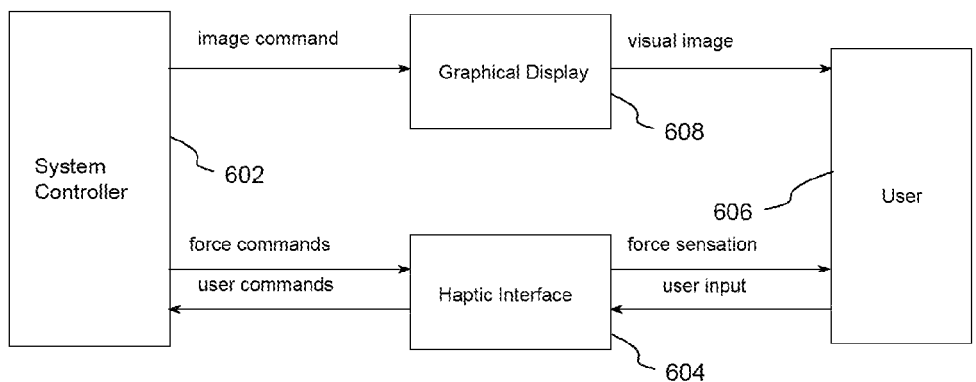
FIG. 37 illustrates a haptic interface system in accordance with aspects of the present invention.

An embodiment 600 of the present invention with a haptic interface application is shown in FIG. 37. In this embodiment a systems controller 602 provides force commands to a haptic interface 604 which generates forces which result in force sensations to user 606. The systems controller 602 may be microprocessor, a central processing unit, an ASIC, a DSP, a game controller, an analog controller, or other type of controller or any combination thereof. The user 606 can input commands to the haptic interface 604 that are transmitted as user commands back to the system controller 602. The user commands can be input through pressing buttons, moving joysticks, squeezing the haptic interface at various level forces, moving the haptic interface, applying force and torque onto the haptic interface and through other means.

In the embodiment shown in FIG. 37, there is preferably a graphical display 608 which receives an image command from the system controller 602 and displays a visual image to the user 606. The graphical display 608 may be, for instance, a computer monitor, a television monitor, an LCD display, a plasma display, a combination of light sources, or other type of means for generating a graphical image. A haptic interface application can also be implemented without a graphical display 608.

A haptic interface application can include a simulation of a virtual environment or representation of a real environment to the user 606. A systems controller method of control can be based upon this real or virtual environment. Typical simulated environments include games, driving and flight simulations, surgical simulations, and other types of simulations. Typical real world environments include control of robots and remote machines, long distance interactions, and other types of environments. It is often desirable that a haptic interface provide force sensations that correlate with the real or simulated environment in which the haptic interface is being used.

Figure 38:
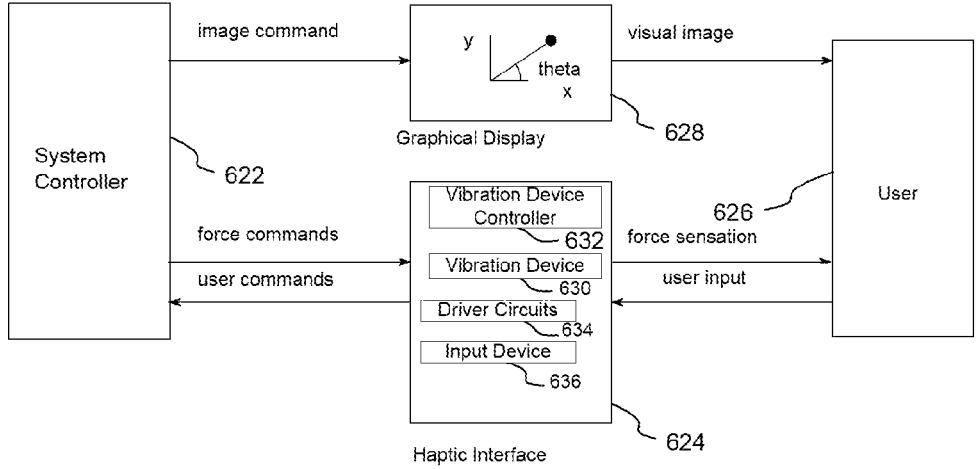
FIG. 38 illustrates another haptic interface system in accordance with aspects of the present invention.

Another embodiment 620 having a haptic interface application is shown in FIG. 38. This embodiment is similar to the one of FIG. 37, and includes a systems controller 622, which provides force commands to a haptic interface 624 that generates forces which result in force sensations being received by user 626. A graphical display 628 is also provided for receiving image commands from the system controller 622 and for displaying a visual image to the user 626.

In the embodiment of FIG. 38, the haptic interface 624 desirably includes a vibration device 630 having vibration actuators (not shown), a vibration controller 632, driver circuits 634 which drive the vibration device actuators, and an input device 636, which can detect user input and which can include buttons, joysticks, and pressure sensors. The components of the haptic interface 624 may be of any of the configurations described herein. In this embodiment the graphical display 628 preferably presents a two dimensional image. The graphical display 628 shows an object of interest at a direction specified by the angle theta. It is may be desirable that the force sensation felt by the user 626 correspond to the image on the graphical display in terms of direction, such as theta, and other attributes.

The embodiment shown in FIG. 38 can be utilized so that the force sensations felt by the user 626 are generated by the vibration device controller 632 specifically to correspond to the image on the graphical display 628. The vibration device controller 632 may specify one or more of the amplitude of vibration, $A_{combined}$, direction of force, theta, and frequency of vibration, f, as described above. The values of $A_{combined}$, theta, and/or f can be selected to correspond to the image on the graphical display 628 and the environment being used by the system controller 622. The complete force effect (including frequency, amplitude, combined direction of force and torque, and duration of force effect) generated by the vibration device may correlate events within a graphical computer simulation. Several examples of such operation follow.

A first example involves the simulation of a user firing a gun. In this simulation, the vibration device controller 632 could specify the angle theta to represent the direction of a gun firing, the amplitude of vibration, $A_{combined}$, to represent the amplitude of the gun recoil, and the frequency of vibration, f, to represent the frequency of bullets leaving the gun.

A second example involves an impact between objects. In this simulation the vibration device controller 632 may specify the angle theta to represent the direction of impact, and the amplitude of vibration, $A_{combined}$, to represent the amplitude of impact.

A third example involves driving a vehicle. In this simulation the vibration device controller 632 could specify the angle theta to represent the direction of vehicle motion, the frequency of vibration, f, to represent the frequency of vehicle vibration as it drives over bumps in the road or the speed of the vehicle, and the amplitude of vibration, $A_{combined}$, to represent the amplitude of bumps in the road.

A fourth example involves a car or spacecraft spinning out of control. In this simulation the vibration device controller 632 could specify an angle theta that represents the vehicle's orientation. To represent the vehicle spinning, the angle theta can vary over time. The rate at which the angle theta can be different than the vibration frequency. Typically the frequency at which a vehicle spins would be significantly lower than typical vibration frequencies.

An algorithm that can be used to create the vehicle spinning described above varies the direction of vibration continually. The direction of vibration may be rotated at a rate of β radians per second, using the equation below:

$$\begin{bmatrix} A_1(t) \\ A_2(t) \end{bmatrix} = D^{-1} A_{combined} \begin{bmatrix} \cos(\beta t) \\ \sin(\beta t) \end{bmatrix} \sin(\omega t + p) \qquad (30)$$

Equation 30 illustrates that the frequency of direction change, β, can be modified independently from the frequency of vibration ω. A user such as user 606 or 626 can sense both the frequency of vibration and the direction of vibration. In this fashion, sensations at both the β and ω frequencies can felt by the user. It is possible to set the frequency β much lower than the frequency ω, thereby overcoming a limitation of known devices. By way of example only, ω may vary between 10 Hz and 100 Hz while β may be on the order of 1 Hz. In another instance, β may vary from between about 5% to 20% of ω. Of course, in other instances ω and β may be similar or the same, or, alternatively, β may be larger than ω. All of these examples will depend on the specific effect that is desired.

Low frequency operation is desirable in some situations, for instance in games that have low frequency effects. For instance, games may generate actions or events in the sub-200 Hertz range, such as between 1 and 150 Hertz. In certain cases the actions or events may be as low as 2 Hertz or lower, such as about 0.5-1 Hertz. Examples of such actions/events include gunshots, automobile related sounds such as corresponding to a car spinning out of control, and helicopter related sounds such as the whirring of the rotor blades. A traditional eccentric mass actuator may not be suitable to generate a haptic sensation in this frequency range; however, two or more vibration actuators operated in synchronized vibration may generate such frequencies.

β is not limited to any particular rate or range of rates. For instance, β may be a relatively low rate to represent a slow spinning action, e.g., of a car spin out at less than 10 miles per hour, or β may be a relatively high rate to represent a fast spinning action, e.g., of a car spin out at a speed in excess of 40 miles per hour. Similarly, ω is not limited to any particular frequency of vibration. Preferably, ω is set within a range of frequencies that can be felt or otherwise detected by a user.

Equation 30 may be modified by changing the vibration profile from a sine wave to a square wave, triangle wave, or other profile. In addition, the amplitude of vibration, $A_{combined}$, can be varied over time. The frequencies β and ω can also be varied over time. In this fashion a wide range of force effects can be created.

Vibration actuators can be used to provide haptic sensations either through synchronized vibration or otherwise. Actuators can be vibrated without synchronization when there is no need to convey directional information, and then the actuators can be switched to synchronous vibration when there is a need to convey directional information though the haptic interface.

Many linear motion vibration actuators take advantage of resonance to achieve relatively high level of forces with low power requirements. However, to achieve these high levels of forces a number of vibration cycles have to occur before the peak magnitude of vibration occurs. In addition when the actuator is shut off, the moving mass in the actuator may continue to oscillate for a number of cycles. Thus the dynamics of the actuator prevents instantaneous response of the actuator to increase or decrease the magnitude of vibration.

When synchronous vibration is used to control the direction of combined force, the actuator dynamics may limit the speed at which the direction of combined force can be changed. One of the examples presented above describes implementation of a haptic force sensation that corresponds to the spinning of a car. However, the actuator dynamics may limit the rate at which such spinning effect can be generated. As will be described in detail below, it is possible to provide a method that can increase the rate at which the direction of force can be changed for a system of vibration actuators that are synchronously vibrated.

Equation 25 above defines the required amplitude of vibration of actuators to achieve a combined force direction corresponding to an angle theta. For a given actuator in a vibration device, the required amplitude of vibration is defined as $A_{des}$, which indicates the desired amplitude of vibration of that actuator. If the actuator is at rest or at a lower level of vibration than $A_{des}$, then it may be desirable to initially drive the actuator at a higher level of vibration to more quickly raise the amplitude of vibration to $A_{des}$. Conversely if the actuator is already vibrating at an amplitude higher than $A_{des}$ it may be desirable to initially drive the actuator at a lower level or even brake the actuator to more quickly lower the amplitude of vibration to $A_{des}$. These variations in the amplitude at which the actuator is driven are defined as corrections to the commanded vibration magnitude.

One method of determining the proper corrections to the vibration magnitude is to model the dynamics of the actuator. This approach allows one to predict the dynamic states of the actuator and optimal commands to most quickly generate the desired amplitude of vibration.

An alternate method of determining the corrections to the vibration magnitude does not require a dynamic model of the actuator or explicitly predicting the dynamic states of the actuator. In this method a counter is maintained to track the recent number of vibrations of the actuator and the corresponding commands sent to the actuator during these recent vibrations. The command to the actuator at the $k^{th}$ vibration is given by the following equation:

$$A_{com\_k} = A_{des\_k} + A_{cor\_k}$$

$A_{des\_k}$ represents the desired actuator amplitude for the $k^{th}$ vibration of the actuator. $A_{cor\_k}$ represents the correction to the command for the $k^{th}$ vibration. And $A_{com\_k}$ represents the actual amplitude of the command sent to the actuator for the $k^{th}$ vibration.

If the desired amplitude at the $k^{th}$ vibration is greater than the amplitude during the previous vibration, then most likely the vibration level needs to be increased. Accordingly, the correction to the command at vibration k, $A_{cor\_k}$, can be chosen to be proportional to the difference between the current desired amplitude, $A_{des\_k}$, and the previous commanded amplitude $A_{com\_k-1}$. An equation which described this approach for calculation $A_{cor\_k}$ is:

$$A_{cor\_k} = K*(A_{des\_k} - A_{com\_k-1}) \qquad (31)$$

Here, K is a gain chosen based upon actuator performance. This same equation works for reducing the magnitude of vibration quickly. When $A_{des\_k}$ is less than the value of $A_{com\_k-1}$, it indicates that most likely the level of vibration needs to be reduced and the correction $A_{cor\_k}$ is negative. If the large reduction in vibration amplitude is commanded, then the negative magnitude of $A_{cor\_k}$ may be greater than $A_{des\_k}$ and the actual command sent to the actuator, $A_{com\_k}$, will be negative resulting in braking of the moving mass in the actuator.

Another approach to correcting the magnitude of vibration takes into consideration the two previous commanded amplitudes, and is given by the following equation:

$$A_{cor\_k} = K_1*(A_{des\_k} - A_{com\_k-1}) + K_2*(A_{des\_k} - A_{com\_k-2}) \qquad (32)$$

Here $K_1$ is a gain that corresponds to the k−1 vibration command, and $K_2$ is a gain that corresponds to the k−2 vibration command. In a similar fashion even more prior commands can be incorporated into the correction algorithm. The following equation shows how "m" prior commands can be incorporated into an actuator command.

$$A_{cor\_k} = K_1*(A_{des\_k} - A_{com\_k-1}) + K_2*(A_{des\_k} - A_{com\_k-2}) + \ldots + K_m*(A_{des\_k} - A_{com\_k-m}) \qquad (33)$$

Figure 39:
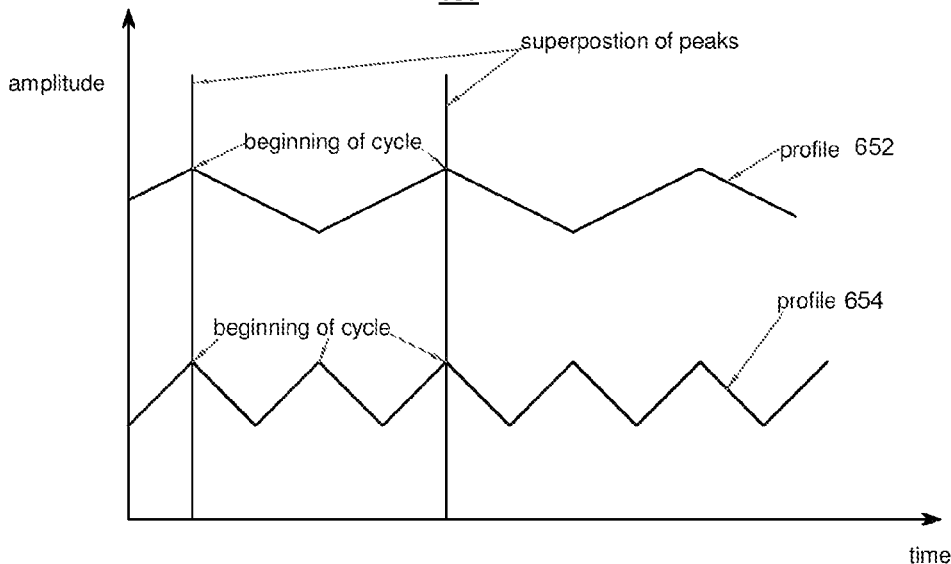
FIG. 39 illustrates control of vibration profiles in accordance with aspects of the present invention.

Alternative methods of control for multiple vibrating actuators may include modified synchronization. One method of modified synchronization is for one actuator to vibrate at a frequency that is an integer multiple of the vibration frequency of another actuator. FIG. 39 is a plot 650 presenting two vibration profiles, 652 and 654, showing such a control method. The vibration frequency of profile 654 is twice the vibration frequency of profile 652. The beginning of cycles of vibration can be controlled to occur at the same time only ever other cycle for profile 2. Thus the superposition of peak amplitudes only occurs ever other cycle for profile 654. This modified synchronization method can be applied for arbitrary integer multiples of vibration frequency, arbitrary vibration profiles, and an arbitrary number of actuators.

One advantage of such a modified synchronization method is that multiple vibration frequencies can occur at the same time while still providing for some superposition or peak amplitudes. The superposition of peak amplitudes allows for control of direction of vibration, in a similar fashion to how the direction for vibration is controlled for synchronized vibration. With this modified method of synchronized vibration, it is possible to specify the direction of combined force only during a portion of the vibration cycle. Nevertheless, a direction component to the vibration can be controlled in the duration close to the time where the superposition of peaks occurs. Close to the time at which there is superposition of peaks in the vibrations, the combined force vector, $F_{combined}$, can be approximated by:

$$F_{combined} = a_1 A_1 + a_2 A_2 \qquad (34)$$

Here, $a_1$ and $a_2$ are the unit vectors aligned with the directions of actuator 1 and actuator 2, respectively. $A_1$ and $A_2$ are the amplitudes of force of actuator 1 and actuator 2, respectively, near the duration of the superposition of peaks. By modifying the amplitudes $A_1$ and $A_2$ it is possible to modify the amplitude and direction of the combined force vector, $F_{combined}$. A similar approach can be used when there are more than two vibration actuators.

If there are two or more vibrating actuators where repeatedly the peak amplitude of force of these vibrating actuators occurs at approximately the same time, then the combined direction of force of these actuators can be controlled near the time when these repeated peak amplitudes occur. In this case, the combined direction of force can be controlled by modifying the amplitude of vibration of the actuators.

An alternative modified synchronization is to drive two vibration actuators at the same frequency but one vibration actuator at a phase where its peak magnitude of force occurs when a second vibration actuator is at zero force, which is at 90 degrees out of phase for a sinusoidal vibration. In such a modified synchronization the combined force direction rotates in a circle or ellipsoid during each vibration period.

Additional methods for modified synchronization of vibration may include the superposition of profiles as described in the "Jules Lissajous and His Figures" ("Lissajous"), appearing in chapter 12 of "Trigonometric Delights" by Eli Maor, published in 1998 by Princeton University Press. The entire disclosure of Lissajous is hereby incorporated by reference. Lissajous describes how profiles can be combined through various combinations of frequencies, phases, amplitudes, and profiles to generate a wide range of output figures. These are also known as Bowditch curves. Lissajous also describes how geometric shapes can be created from multiple vibration sources. These combinations of vibrations can be applied to haptic devices and vibration devices in accordance with aspects of the present invention. Thus, the concepts of superposition described in Lissajous can be applied by vibration actuators to yield a wide range of force sensations.

Electric actuators often require a driver circuit separate from a controller. The driver circuit provides sufficient current and voltage to drive the Actuators with the necessary electrical power. A wide range of driver circuits have been developed for electrical actuators and specifically for vibration actuators, and are known to those skilled in the field. Such driver circuits include linear drivers, PWM drivers, unipolar drivers, and bipolar drivers. A circuit block diagram for a vibration actuator 700 according to the present invention includes a vibration controller 702, a driver circuit 704, and an actuator 706, as shown in FIG. 40.

Figure 40:
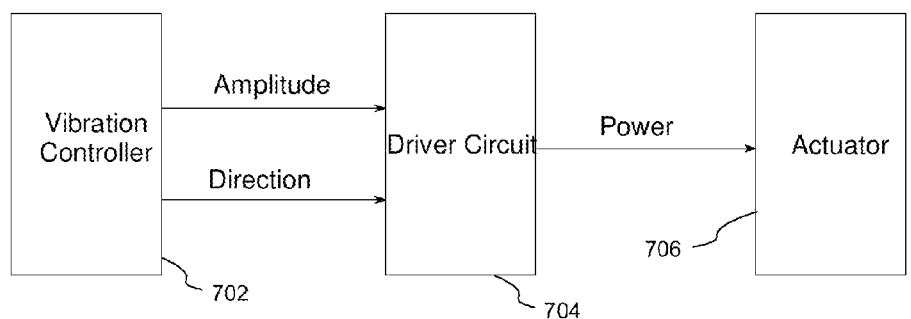
FIG. 40 illustrates a vibration actuator in accordance with aspects of the present invention.

The vibration controller 702 shown in FIG. 40 can be located on the vibration device itself or could be located remotely, where the vibration signals are transmitted to the driver circuit 704 through wired or wireless communication.

It is often desirable to control a vibration device or actuators from a digital controller such as a microprocessor or other digital circuit. Digital control circuits often have low level power output, and therefore require a higher power driver circuit to drive an actuator. In addition, low cost digital controllers often have digital outputs, but do not have analog outputs. To simplify the vibration controller circuitry and lower cost, the vibration signal can be a binary logic directional signal which signals the moving mass to move either forward or backwards. In this configuration, the vibration signal can be in the form of a square wave to generate the desired vibration effect. Even with such a square wave control signal, the actual motion and vibration force of the vibration actuator will most likely not follow a square wave exactly due to the dynamics of the actuator.

Figure 41:
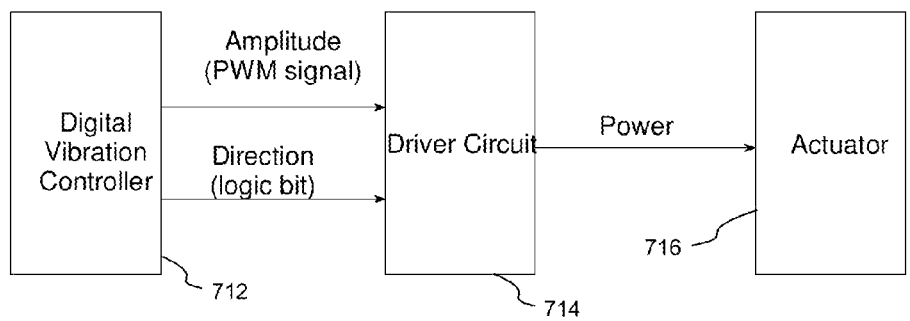
FIG. 41 illustrates another vibration actuator in accordance with aspects of the present invention.

To further simplify the vibration controller circuitry and lower cost, the amplitude of the vibration signal can be modulated with a PWM signal, where the duty cycle of the signal is proportional to the amplitude of vibration. An embodiment 710 with such a digital vibration controller 712 for one actuator 716 is shown in FIG. 41. In this embodiment, the output of the digital vibration controller 712 includes an amplitude signal in PWM form and a direction signal, for instance in the form of a logic bit, both of which preferably are sent to a driver circuit 714. The driver circuit 714, in turn, sends electrical power to the actuator 716.

Digital control circuitry can be used to control a complete vibration device in synchronized vibration. In synchronized vibration the frequency and phase of two or more actuators are the same. Accordingly, a single square wave can be used to control the direction of the vibration actuators that are in synchronized vibration. The amplitude of vibration can be controlled independently for each actuator, with separate PWM signals.

Figure 42:
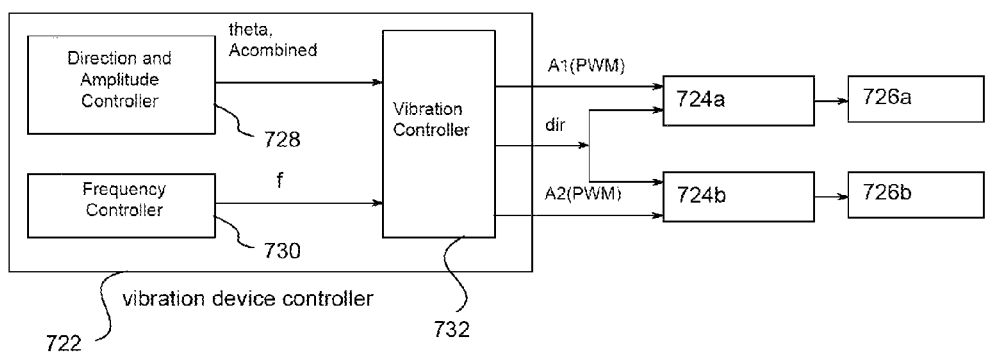
FIG. 42 illustrates a vibration device controller in accordance with aspects of the present invention.

FIG. 42 shows an embodiment 720 where a vibration device controller 722 generates one directional signal ("dir"), which may be in the form of a square wave. The dir signal is preferably provided to a pair of drive circuits 724a and 724b. The vibration device controller 722 desirably generates separate amplitude signals, $A_1$ and $A_2$, in PWM form to the drive circuits 724a,b for a pair of actuators 726a and 726b. The vibration device controller 722 preferably includes a direction and amplitude controller 728, a frequency controller 730 and a vibration controller 732 as in the embodiment described above with regard to FIG. 35. The direction and amplitude controller 728, the frequency controller 730 and the vibration controller 732 may be configured in hardware, software, firmware or a combination thereof, and may be implemented either as separate components or processes, or may be implemented as a single component or process.

The embodiment 720 of FIG. 42 may be used to control in synchronous vibration the vibration devices with two actuators, for instance as described above with regard to FIGS. 10-20. Embodiment 720 can also be used to vibrate two or more actuators completely out of phase, which occurs during synchronized vibration when equation 25 provides results with the sign of $A_1$ being different than the sign of $A_2$. To vibrate two actuators completely out of phase, the binary direction signal dir can be inverted for one of the actuators. The inversion of the directional signal dir can occur at a driver circuit 724a or 724b, or the vibration controller 732 can output two directional signals, with one being the inverse of the other. The case where two actuators are being driven completely out of phase is shown in FIG. 13.

Electric actuators in accordance with the present invention can be driven with unipolar or bipolar drivers. A unipolar driver will generate current in an actuator in a single direction. A unipolar driver is well suited for actuators where the moving mass is ferromagnetic and an electromagnetic coil only generates attractive magnetic forces, such as the actuator 150 shown in FIG. 9. One example of a unipolar driver circuit is a Darlington array, such as the ULN2803A DARLINGTON TRANSISTOR ARRAY manufactured by Texas Instruments.

A bipolar driver can generate current in two directions. Bipolar drivers are well suited for actuators where the moving mass is magnetic and where reversing the direction of current in an electromagnetic coil can reverse the direction of force on the moving mass. Examples of such actuators are presented in FIGS. 5A-B through 8A-B. One example for a bipolar driver circuit is an H bridge, such as the L298 manufactured by ST Microelectronics. Alternative H bridges are the 3958 and 3959 drivers manufactured by Allegro Microsystems.

In vibrating circuits it can be advantageous to increase power output of the driver circuits through use of a charge pump capacitor as used in 3958 and 3959 drivers manufactured by Allegro Microsystems. It can also be advantageous to incorporate a capacitor in series with a linear motion vibrating actuator to benefit from a resonance effect and temporary storage of energy in the capacitor, as described in the aforementioned U.S. Patent Application entitled "Vibration Device."

As detailed herein, vibration actuators can be used in a variety of methods to create haptic effects. Vibration actuators can be operated continuously throughout the duration of a specified haptic effect, or can be pulsed on and off during the haptic effect. By pulsing vibration actuators on and off the user feels only a small number of vibrations, then feels a pause, and then the vibration resumes. In this fashion it is possible to generate secondary sensations associated with the frequency of pulsing the actuators on and off. Examples of how such pulse effects can be used are described in U.S. Pat. Nos. 6,275,213 and 6,424,333.

Any of the actuators described herein may be used in accordance with the present invention to produce a wide variety of haptic effects. While some actuators such as linear actuators and rocking mass actuators may be particularly suited for low frequency operation, all actuators herein may provide synchronized feedback. Such feedback may be employed in games, virtual reality equipment, real-world equipment such as surgical tools and construction equipment, as well as portable electronic devices such as cellular phones and pagers. By way of example only, cellular phones and pagers may implement different vibration effects to identify different callers or different actions. Synchronized vibration may provide directional feedback, for instance, with the impact or recoil of a gun in a game, or to distinguish between frontal and side impacts in driving games. Synchronized vibration may also provide a continual rotation of a vibration force vector in a game to simulate a car spinning out of control. Synchronized vibration may also be used in endless other applications and situations to provide a rich haptic experience to a user.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. By way of example only, it is possible to vary aspects of the embodiments herein to some degree while achieving synchronous vibration and other benefits of the invention. For instance, the frequency of vibration, amplitude of vibration, profile or waveform of vibration, phase of vibration, timing of vibration, alignment of actuators, rigidity of the vibration device, rigidity of the attachment between the actuators and the vibration device, and design and control parameters may all be adjusted, either independently or in any combination thereof.

The invention claimed is:

1. A vibration device adapted to produce haptic sensations, comprising:
  a base member;
  a plurality of actuators being coupled to the base member and including:
    a first actuator having a first member and a second member, the first member thereof being operatively coupled to the base member, and the second member thereof being moveable relative to the first member of the first actuator, and
    a second actuator having a first member and a second member, the first member thereof being operatively coupled to the base member, and the second member thereof being moveable relative to the first member of the second actuator; and
  means for modified synchronization of vibration of at least the first and second ones of the plurality of actuators, wherein the second actuator vibrates at a frequency that is an integer multiple of the vibration frequency of the first actuator, the value of the integer being greater than one;
  wherein vibrations from the first and second actuators are superimposed to produce a combined force vector $F_{combined}$ according to the following equation:

$$F_{combined} = a_1 A_1 + a_2 A_2,$$

where $a_1$ and $a_2$ are unit vectors aligned with corresponding directions of the first actuator and the second actuator, respectively;
  wherein the combined force vector $F_{combined}$ is controlled by modifying amplitudes of vibration of the first and second actuators when repeated superposition of peak amplitudes occur.

2. The vibration device of claim 1, wherein the second actuator is oriented non-orthogonally relative to the first actuator.

3. The vibration device of claim 2, wherein at least one of the first and second actuators comprises a linear actuator.

4. The vibration device of claim 1, wherein the first and second actuators each comprise a rotary actuator having an axis of rotation, and wherein the axes of rotation of the first and second actuators are not parallel to one another.

5. The vibration device of claim 4, wherein axes of rotation of the first and second actuators are not orthogonal to one another.

6. The vibration device of claim 5, wherein the rotary actuators of the first and second actuators each include an eccentric mass.

7. The vibration device of claim 1, wherein the means for modified synchronization of vibration is operable to generate at least one Lissajous profile to produce one or more selected haptic sensations.

8. The vibration device of claim 1, wherein the first and second actuators are controllable to generate a combined torque.

9. The vibration device of claim 1, wherein at least the first and second actuators of the plurality of actuators are configured to be synchronously vibrated for a first duration of time and are configured to be vibrated asynchronously for a second duration of time.

10. The vibration device of claim 1, wherein:
  the plurality of actuators further includes a third actuator having a first member and a second member, the first member thereof being operatively coupled to the base member, and the second member thereof being moveable relative to the first member of the third actuator; and
  the means for modified synchronization of vibration is configured to vibrate the third actuator at a frequency that is an integer multiple of the vibration frequency of the first actuator, the value of the integer being greater than one.

11. The vibration device of claim 10, wherein the combined force vector $F_{combined}$ of the plurality of actuators controls the combined direction of force by modifying amplitudes of vibration of each of the first, second and third actuators when repeated superposition of peak amplitudes occur.

12. A vibration device, comprising:
  a base member;
  a plurality of actuators being coupled to the base member and including:
    a first actuator having a first member and a second member, the first member thereof being operatively coupled to the base member, and the second member thereof being moveable relative to the first member of the first actuator, and a second actuator having a first member and a second member, the first member thereof being operatively coupled to the base member, and the second member thereof being moveable relative to the first member of the second actuator;

means for synchronously vibrating the first and second actuators, wherein the second actuator the means for synchronously vibrating is configured to vibrate the second actuator at a frequency that is an integer multiple of a vibration frequency of the first actuator, the value of the integer being greater than one; and means for exciting the first and second actuators at a resonant frequency;

wherein vibrations from the first and second actuators are superimposed to produce a combined force vector $F_{combined}$ according to the following equation:

$$F_{combined} = a_1 A_1 + a_2 A_2,$$

where $a_1$ and $a_2$ are unit vectors aligned with corresponding directions of the first actuator and the second actuator, respectively;

wherein the combined force vector $F_{combined}$ is controlled by modifying amplitudes of vibration of the first and second actuators when repeated superposition of peak amplitudes occur.

13. The vibration device of claim 12, wherein the resonant frequency is within a range of frequencies, and the exciting means is operable to excite the first and second actuators over the range of frequencies including the resonant frequency.

14. The vibration device of claim 12, wherein the second actuator is oriented non-orthogonally and non-parallel to the first actuator.

15. The vibration device of claim 12, wherein the means for synchronously vibrating and the means for exciting comprise a vibration controller, and wherein the vibration controller is operable to wirelessly control the first and second actuators.

16. The vibration device of claim 12, wherein the means for synchronously vibrating is operable to generate at least one Lissajous profile to produce one or more selected haptic sensations.

17. The vibration device of claim 16, wherein the at least one Lissajous profile is a parabola.

18. The vibration device of claim 16, wherein the at least one Lissajous profile is a hyperbola.

19. The vibration device of claim 12, wherein at least the first and second actuators of the plurality of actuators are configured to be synchronously vibrated for a first duration of time and is configured to be vibrated asynchronously for a second duration of time.

20. A vibratory control system, comprising:

a plurality of actuators coupled to a base, the plurality of actuators including at least first and second actuators;

a first driver operatively coupled to the first actuator, the first driver being configured to provide a signal waveform having a first vibration frequency to the first actuator;

a second driver being operatively coupled to the second actuator, the second driver being configured to provide a signal waveform having a second vibration frequency to the second actuator; and a controller coupled to the plurality of drivers, the controller being configured to generate the signal waveforms for the first and second drivers and being operable to synchronously vibrate the first and second actuators to produce a pattern using the signal waveforms;

wherein the second vibration frequency is an integer multiple of the first vibration frequency, the value of the integer being greater than one, and wherein vibrations from the first and second actuators are superimposed to produce a combined force vector $F_{combined}$ according to the following equation:

$$F_{combined} = a_1 A_1 + a_2 A_2,$$

where $a_1$ and $a_2$ are unit vectors aligned with corresponding directions of the first actuator and the second actuator, respectively;

wherein the combined force vector $F_{combined}$ is controlled by modifying amplitudes of vibration of the first and second actuators when repeated superposition of peak amplitudes occur.

21. The vibratory control system of claim 20, wherein the pattern is part of a sequence of patterns.

22. The vibratory control system of claim 20, wherein the pattern includes a circle, an ellipse or a straight line, and wherein an amplitude and duration of the pattern is controllable over time with the controller.

23. The vibratory control system of claim 20, wherein the controller is configured to obtain input parameters for the pattern, the input parameters including at least one of a pattern number, an amplitude, a duration and a start-time.

24. The vibratory control system of claim 20, wherein at least one of the first and second actuators is a piezoelectric actuator.

25. The vibratory control system of claim 20, wherein the signal waveform for the first actuator comprises a first pulse width modulated signal, and the signal waveform for the second actuator comprises a second pulse width modulated signal.

26. The vibratory control system of claim 20, further comprising a haptic interface operable to provide a force sensation to a user.

27. The vibratory control system of claim 26, wherein the controller is further operable to provide a torque sensation to the user.

28. The vibratory control system of claim 20, wherein the controller is further operable to generate a combined torque using the first and second actuators.

29. The vibratory control system of claim 20, further comprising a haptic interface operable to provide a vibrating force sensation to a user.

30. The vibratory control system of claim 29, wherein the controller is further operable to provide a vibrating torque sensation to the user.

31. The vibratory control system of claim 20, wherein the controller is further operable to generate a vibrating torque using the first and second actuators.

32. The vibratory control system of claim 20, wherein the signal waveform for the first actuator comprises a first binary logic directional signal, and the signal waveform for the second actuator comprises a second binary logic directional signal.

33. The vibratory control system of claim 20, wherein the controller is operable to cause the first and second actuators to pulse on and off during a specified haptic effect, thereby generating one or more secondary sensations associated with a frequency of the pulsing.

34. The vibratory control system of claim 20, wherein the controller is operable to synchronously vibrate the first and second actuators to produce a varying rotation of a vibration force vector.

35. A vibratory control system, comprising:

a plurality of actuators coupled to a base, the plurality of actuators including at least first and second actuators;

a first driver operatively coupled to the first actuator, the first driver being configured to provide a signal waveform having a first vibration frequency to the first actuator;

a second driver being operatively coupled to the second actuator, the second driver being configured to provide a signal waveform having a second vibration frequency to the second actuator; and a controller coupled to the plurality of drivers, the controller being configured to generate the signal waveforms for the first and second actuators and being operable to synchronously vibrate the first and second actuators via the first and second drivers to generate a combined torque vibration on the base;

wherein the second vibration frequency is an integer multiple of the first vibration frequency, the value of the integer being greater than one, and wherein vibrations from the first and second actuators are superimposed by the controller such that beginnings of cycles of vibration are controlled to occur at the same time according to the integer multiple to produce a combined force vector $F_{combined}$ according to the following equation:

$$F_{combined} = a_1 A_1 + a_2 A_2,$$

where $a_1$ and $a_2$ are unit vectors aligned with corresponding directions of the first actuator and the second actuator, respectively;

wherein the combined force vector $F_{combined}$ is controlled by modifying amplitudes of vibration of the first and second actuators when repeated superposition of peak amplitudes occur.

36. The vibratory control system of claim 35, wherein the first and second actuators are linear actuators having an aligned orientation, the linear actuators being separated by a specified distance.

37. The vibratory control system of claim 35, wherein the controller is further operable to control a direction of a combined vibration force applied onto the base member by the first and second actuators.

38. The vibratory control system of claim 35, wherein the controller is further operable to excite the first actuator at a first resonant frequency and the second actuator at a second resonant frequency.

39. The vibratory control system claim 38, wherein the first resonant frequency is within a first range of frequencies, the second resonant frequency is within a second range of frequencies, and the controller is operable to excite the first actuator over the first range of frequencies including the first resonant frequency and to excite the second actuator over the second range of frequencies including the second resonant frequency.

* * * * *

UNITED STATES PATENT AND TRADEMARK OFFICE
CERTIFICATE OF CORRECTION

| | | |
|---|---|---|
| PATENT NO. | : 8,384,316 B2 | Page 1 of 1 |
| APPLICATION NO. | : 13/030663 | |
| DATED | : February 19, 2013 | |
| INVENTOR(S) | : John Houston and Nathan Delson | |

It is certified that error appears in the above-identified patent and that said Letters Patent is hereby corrected as shown below:

In the Specification

Col. 1, Line 43, delete "is"
Col. 2, Line 11, delete "of"
Col. 2, Line 32, after "two" insert -- - --
Col. 2, Line 38, after "three" insert -- - --
Col. 2, Line 43, after "two" insert -- - --
Col. 2, Line 45, after "three" insert -- - --
Col. 2, Line 62, delete "of"
Col. 3, Line 7, after "hand" insert -- - --
Col. 3, Line 23, "corresponds" should read --correspond--
Col. 4, Line 6, after "three" insert -- - --
Col. 4, Line 10, "comprising" should read --comprises--
Col. 8, Line 11, "being greater" should read --is greater--
Col. 8, Line 41, "including" should read --includes--
Col. 9, Line 21, after "three" insert -- - --
Col. 11, Line 32, delete "use"
Col. 11, Line 64, "include" should read --includes--
Col. 17, Line 38, "changed be" should read --changed to be--
Col. 17, Line 39, "direction that shown" should read --direction as shown--
Col. 18, Line 63, after "two" insert -- - --
Col. 19, Line 20, after "two" insert -- - --
Col. 19, Line 23, after "two" insert -- - --
Col. 19, Line 60, after "three" insert -- - --
Col. 19, Line 67, after "three" insert -- - --
Col. 20, Line 2, after "three" insert -- - --
Col. 20, Line 4, after "three" (first occurrence) insert -- - --
Col. 20, Line 4, after "three" (second occurrence) insert -- - --

Signed and Sealed this
Twenty-fourth Day of February, 2015

Michelle K. Lee
*Deputy Director of the United States Patent and Trademark Office*